(12) United States Patent
Donnellan et al.

(10) Patent No.: US 12,504,209 B2
(45) Date of Patent: Dec. 23, 2025

(54) REFRIGERATION SYSTEM AND METHOD OF OPERATING A REFRIGERATION SYSTEM

(71) Applicant: THERMO KING LLC, Minneapolis, MN (US)

(72) Inventors: Wayne Donnellan, Galway (IE); Michael Greene, Galway (IE); Gurudath Nayak Hebri, Karnataka (IN)

(73) Assignee: THERMO KING LLC, Minneapolis, MN (US)

( * ) Notice: Subject to any disclaimer, the term of this patent is extended or adjusted under 35 U.S.C. 154(b) by 221 days.

(21) Appl. No.: 18/408,791

(22) Filed: Jan. 10, 2024

(65) Prior Publication Data

US 2024/0230180 A1    Jul. 11, 2024

(30) Foreign Application Priority Data

Jan. 10, 2023  (IN) .............................. 202311001964
Feb. 22, 2023  (EP) ...................................... 23158026

(51) Int. Cl.
*F25B 41/26*    (2021.01)
*F25B 13/00*    (2006.01)

(52) U.S. Cl.
CPC .............. *F25B 41/26* (2021.01); *F25B 13/00* (2013.01)

(58) Field of Classification Search
CPC ............................ F25B 41/26; F25B 13/00; F25B 2700/21174; F25B 2700/21175; F25B 5/04; F25B 6/04; F25B 2400/054; F25B 40/00; F25B 49/02; F25B 1/005; F25B 41/31; F25B 41/40; F25B 2600/2513

(Continued)

(56) References Cited

U.S. PATENT DOCUMENTS 3,381,487 A * 5/1968 Harnish ................... F25B 13/00
                                                        62/196.4
4,193,781 A * 3/1980 Vogel ....................... F25B 49/02
                                                        62/81

(Continued)

FOREIGN PATENT DOCUMENTS

DE    10 2019 001 638         9/2020

OTHER PUBLICATIONS

Extended European Search Report, issued in the corresponding EP patent application No. 23158026.7, dated Aug. 29, 2023, 5 pages.

*Primary Examiner* — Eric S Ruppert
*Assistant Examiner* — Kirstin U Oswald
(74) *Attorney, Agent, or Firm* — HSML P.C.

(57) ABSTRACT

A refrigeration system comprising a controller is provided. The controller is configured to: determine one or more parameters of the refrigeration system; determine whether a first mode selection condition has been met and/or whether a second mode selection condition has been met based on the determined one or more parameters; select a first mode upon the first mode selection condition having been determined to have been met and/or upon the second mode selection condition having been determined to have not been met; select a second mode upon the second mode selection condition having been determined to have been met and/or upon the first mode selection condition having been determined to have not been met; and operate the refrigeration system in the selected mode.

15 Claims, 11 Drawing Sheets

(58) Field of Classification Search
 USPC .......................................................... 62/117
 See application file for complete search history.

(56) References Cited

U.S. PATENT DOCUMENTS

| | | | | |
|---|---|---|---|---|
| 4,325,223 | A * | 4/1982 | Cantley | F25B 49/02 702/182 |
| 4,833,893 | A * | 5/1989 | Morita | F25B 40/04 62/278 |
| 5,007,245 | A * | 4/1991 | Defenbaugh | B60H 1/323 62/227 |
| 5,140,827 | A * | 8/1992 | Reedy | F25B 13/00 62/324.4 |
| 5,341,649 | A * | 8/1994 | Nevitt | F25B 41/006 62/126 |
| 9,599,384 | B2 * | 3/2017 | Weyna | F25B 49/027 |
| 9,797,639 | B2 * | 10/2017 | Schmidt | F25B 41/34 |
| 11,448,438 | B2 * | 9/2022 | Waters | F25B 41/22 |
| 11,953,240 | B2 * | 4/2024 | Raimbault | F25B 29/003 |
| 12,123,634 | B2 * | 10/2024 | Houdek | F25B 40/00 |
| 2005/0126190 | A1* | 6/2005 | Lifson | F25B 49/005 62/149 |
| 2006/0042282 | A1* | 3/2006 | Ludwig | F25B 41/20 62/159 |
| 2006/0080989 | A1* | 4/2006 | Aoki | F25B 40/00 62/324.4 |
| 2006/0243257 | A1* | 11/2006 | Freund | F02N 19/04 123/550 |
| 2010/0199712 | A1* | 8/2010 | Lifson | F25B 41/24 62/528 |
| 2011/0174014 | A1* | 7/2011 | Scarcella | F25B 9/008 62/512 |
| 2012/0011866 | A1* | 1/2012 | Scarcella | F25B 41/39 62/79 |
| 2014/0082960 | A1* | 3/2014 | Bison | F25B 49/02 34/477 |
| 2014/0208785 | A1* | 7/2014 | Wallace | F25B 49/02 62/190 |
| 2014/0208787 | A1* | 7/2014 | Furui | F25B 1/10 62/238.6 |
| 2018/0017300 | A1* | 1/2018 | Shockley | F25D 21/008 |
| 2018/0128529 | A1* | 5/2018 | Chen | F25B 45/00 |
| 2019/0170600 | A1* | 6/2019 | Tice | G01M 3/2815 |
| 2020/0232673 | A1* | 7/2020 | Kozasa | F24F 12/003 |
| 2021/0063070 | A1* | 3/2021 | Raimbault | F25B 13/00 |
| 2021/0262655 | A1* | 8/2021 | Isa | F24H 15/242 |
| 2022/0357078 | A1* | 11/2022 | Ladd | F25B 1/10 |
| 2023/0122568 | A1* | 4/2023 | Cornelis | F25B 30/02 62/324.1 |

\* cited by examiner

REFRIGERATION SYSTEM AND METHOD OF OPERATING A REFRIGERATION SYSTEM

FIELD

The disclosure relates to a refrigeration system and a method of operating a refrigeration system.

BACKGROUND

It is known to control a refrigeration system by actuating an expansion valve based on a monitored superheat of refrigerant within a suction line downstream of an evaporator. Such control methods are conventionally used to reduce the probability of liquid droplets being present within gaseous refrigerant upon entry to a compressor of the refrigeration system. Such control methods are associated with increased capacity, thermal efficiency and reliability of the refrigeration system. However, they may increase the likelihood of damage to the refrigeration system, particularly when the refrigeration system is charged with low global warming potential (GWP) refrigerant.

It is therefore desirable to provide an improved refrigeration system and method of operating a refrigeration system.

SUMMARY

According to an aspect there is described a refrigeration system, the refrigeration system comprising: a compressor; a condenser; an expansion valve; an evaporator; a liquid-suction heat exchanger; a suction line configured to convey a refrigerant from the evaporator to the compressor via the liquid-suction heat exchanger; a discharge line configured to convey the refrigerant from the compressor to the condenser; an upstream suction line temperature sensor configured to sense a temperature of the refrigerant in the suction line upstream of the liquid-suction heat exchanger; an upstream suction line pressure sensor configured to sense a pressure of the refrigerant in the suction line upstream of the liquid-suction heat exchanger; a downstream suction line temperature sensor configured to sense a temperature of the refrigerant in the suction line downstream of the liquid-suction heat exchanger; a downstream suction line pressure sensor configured to sense a pressure of the refrigerant in the suction line downstream of the liquid-suction heat exchanger; and a controller. The controller is configured to: determine one or more parameters of the refrigeration system; determine whether a first mode selection condition has been met and/or whether a second mode selection condition has been met based on the determined one or more parameters; select a first mode upon the first mode selection condition having been determined to have been met and/or upon the second mode selection condition having been determined to have not been met; select a second mode upon the second mode selection condition having been determined to have been met and/or upon the first mode selection condition having been determined to have not been met; and operate the refrigeration system in the selected mode. Operating the refrigeration system in the first mode comprises controlling the expansion valve to bring a superheat of the refrigerant in the suction line upstream of the liquid-suction heat exchanger towards a first target superheat value or towards or within a first target range of superheat values, wherein the superheat of the refrigerant in the suction line upstream of the liquid-suction heat exchanger is determined based on the sensed temperature and pressure of the refrigerant in the suction line upstream of the liquid-suction heat exchanger. Operating the refrigeration system in the second mode comprises controlling the expansion valve to bring a superheat of the refrigerant in the suction line downstream of the liquid-suction heat exchanger towards a second target superheat value or towards or within a second target range of superheat values, wherein the superheat of the refrigerant in the suction line downstream of the liquid-suction heat exchanger is determined based on the sensed temperature and pressure of the refrigerant in the suction line downstream of the liquid-suction heat exchanger.

The controller may be configured to: select the first mode upon the first mode selection condition having been determined to have been met or upon the second mode selection condition having been determined to have not been met; and select the second mode upon the second mode selection condition having been determined to have been met or upon the first mode selection condition having been determined to have not been met.

The controller may be configured to: determine whether the first mode selection condition has been met and whether the second mode selection condition has been met; select the first mode upon the first mode selection condition having been determined to have been met; select the second mode upon the second mode selection condition having been determined to have been met; and upon determining that neither the first mode selection condition nor the second mode selection condition have been met, select the first mode if the refrigeration system is currently operating in the first mode and select the second mode if the refrigeration system is currently operating in the second mode.

The controller may be configured to: determine whether the first mode selection condition has been met and whether the second mode selection condition has been met; select the first mode upon the first mode selection condition having been determined to have been met; select the second mode upon the second mode selection condition having been determined to have been met; and upon determining that neither the first mode selection condition nor the second mode selection condition have been met, select the second mode.

The controller may be configured to: determine whether the first mode selection condition has been met and whether a second mode selection condition has been met; select the first mode upon the first mode selection condition having been determined to have been met; select the second mode upon the second mode selection condition having been determined to have been met; and upon determining that neither the first mode selection condition nor the second mode selection condition have been met, select the first mode.

The refrigeration system may further comprise an accumulator tank configured to remove liquid droplets from the refrigerant within the suction line. The accumulator tank may be disposed along the suction line downstream of the downstream suction line pressure and temperature sensors.

The refrigeration system may further comprise: an additional downstream suction line temperature sensor configured to sense an additional temperature of the refrigerant in the suction line upstream of the downstream suction line pressure and temperature sensors; and an additional downstream suction line pressure sensor configured to sense an additional pressure of the refrigerant in the suction line upstream of the downstream suction line pressure and temperature sensors. The controller may be configured to: determine whether the first mode selection condition has been met and whether the second mode selection condition has been met; select the first mode upon the first mode selection condition having been determined to have been met; select the second mode upon the second mode selection condition having been determined to have been met; upon determining that neither the first mode selection condition nor the second mode selection condition have been met, select a third mode; and operate the refrigeration system in the selected mode. Operating the refrigeration system in the third mode may comprise controlling the expansion valve to bring a superheat of the refrigerant in the suction line upstream of the downstream suction line pressure and temperature sensors towards a third target superheat value or towards or within a third target range of superheat values. The superheat of the refrigerant in the suction line upstream of the downstream suction line pressure and temperature sensors may be determined based on the sensed additional temperature and additional pressure of the refrigerant in the suction line upstream of the downstream suction line pressure and temperature sensors.

The refrigeration system may further comprise an accumulator tank configured to remove liquid droplets from the refrigerant within the suction line. The accumulator tank may be disposed along the suction line upstream of the downstream suction line pressure and temperature sensors and downstream of the additional downstream suction line pressure and temperature sensors.

The parameter of the refrigeration system may be a temperature of the refrigerant within the discharge line. The first mode selection condition may be determined to have been met when the temperature of the refrigerant within the discharge line is less than a first threshold temperature value. The second mode selection condition may be determined to have been met when the temperature of the refrigerant within the discharge line is greater than a second threshold temperature value.

The parameter of the refrigeration system may be a sensed temperature of the refrigerant within the discharge line. The refrigeration system may comprise a discharge line sensor disposed along the discharge line and configured to sense the sensed temperature of the refrigerant within the discharge line. The first mode selection condition may be determined to have been met when the sensed temperature of the refrigerant within the discharge line is less than the first threshold temperature value. The second mode selection condition may be determined to have been met when the sensed temperature of the refrigerant within the discharge line is greater than the second threshold temperature value.

The parameter of the refrigeration system may be a calculated temperature of the refrigerant within the discharge line. The controller may be configured to calculate the calculated temperature of the refrigerant within the discharge line. The first mode selection condition may be determined to have been met when the calculated temperature of the refrigerant within the discharge line is less than the first threshold temperature value. The second mode selection condition may be determined to have been met when the calculated temperature of the refrigerant within the discharge line is greater than the second threshold temperature value. The refrigeration system may further comprise a discharge line pressure sensor configured to sense the pressure of the refrigerant within the discharge line. The controller may be configured to calculate the calculated temperature of the refrigerant within the discharge line based on a speed of the compressor, a temperature of the refrigerant within the suction line, a pressure of the refrigerant within the suction line and the sensed pressure of the refrigerant in the discharge line.

The parameter of the refrigeration system may be an estimated temperature of the refrigerant within the discharge line. The controller may be configured to estimate the estimated temperature of the refrigerant within the discharge line using a predetermined model. The predetermined model may have the estimated temperature of the refrigerant within the discharge line as an output. The first mode selection condition may be determined to have been met when the estimated temperature of the refrigerant within the discharge line is less than the first threshold temperature value. The second mode selection condition may be determined to have been met when the estimated temperature of the refrigerant within the discharge line is greater than the second threshold temperature value. The condenser may be configured to reject heat into an external medium. The evaporator may be configured to receive heat from a process medium. The refrigeration system may comprise a process medium temperature sensor configured to sense a temperature of the process medium. The refrigeration system may comprise an external medium temperature sensor configured to sense a temperature of the external medium. The refrigeration system may comprise a plurality of valves for controlling a flow of the refrigerant. The predetermined model may have at least the sensed temperature of the process medium, the sensed temperature of the process medium, the positions of the valves and the speed of the compressor as inputs.

The parameter of the refrigeration system may be a pressure ratio of the compressor. The controller may be configured to determine the pressure ratio of the compressor. The pressure ratio of the compressor may be the ratio of the pressure of the refrigerant provided to the compressor to the pressure of the refrigerant discharged from the compressor. The first mode selection condition may be determined to have been met when the pressure ratio of the compressor is less than a first threshold pressure ratio value. The second mode selection condition may be determined to have been met when the pressure ratio of the compressor is greater than a second threshold pressure ratio value.

A first parameter of the parameters of the refrigeration system determined by the controller may be a pressure ratio of the compressor. The pressure ratio of the compressor may be the ratio of the pressure of the refrigerant provided to the compressor to the pressure of the refrigerant discharged from the compressor. The first mode selection condition may be determined to have been met when the pressure ratio of the compressor is less than a threshold pressure ratio value. A second parameter of the parameters of the refrigeration system determined by the controller may be a sensed temperature of the refrigerant within the discharge line. The refrigeration system may comprise a discharge line sensor disposed along the discharge line and configured to sense the sensed temperature of the refrigerant within the discharge line. The second mode selection condition may be determined to have been met when the sensed temperature of the refrigerant within the discharge line is greater than a threshold temperature value.

A first parameter of the parameters of the refrigeration system determined by the controller may be a temperature of a process medium. A second parameter of the parameters of the refrigeration system determined by the controller may be a temperature of an external medium. The condenser may be configured to reject heat into the external medium. The evaporator may be configured to receive heat from the process medium. The refrigeration system may comprise a process medium temperature sensor configured to sense the temperature of the process medium. The refrigeration system may comprise an external medium temperature sensor configured to sense the temperature of the external medium. The first mode selection condition may be determined to have been met when the external medium temperature is less than a first external medium temperature threshold and the process medium temperature is greater than a first process medium temperature threshold. The second mode selection condition may be determined to have been met when the external medium temperature is greater than a second external medium temperature threshold and the process medium temperature is less than a second process medium temperature threshold.

The first and second target superheat values may be the same. The first and second target range of superheat values may be the same. The first, second and third target superheat values may be the same. The first, second and third target range of superheat values may be the same.

According to an aspect there is described a method of operating a refrigeration system as stated in any preceding statement, the method comprising: determining one or more parameters of the refrigeration system; determining whether a first mode selection condition has been met and/or whether a second mode selection condition has been met based on the determined one or more parameters; selecting a first mode upon the first mode selection condition having been determined to have been met and/or upon the second mode selection condition having been determined to have not been met; selecting a second mode upon the second mode selection condition having been determined to have been met and/or upon the first mode selection condition having been determined to have not been met; and operating the refrigeration system in the selected mode. Operating the refrigeration system in the first mode comprises controlling the expansion valve to bring a superheat of the refrigerant in the suction line upstream of the liquid-suction heat exchanger towards a first target superheat value or towards or within a first target range of superheat values, wherein the superheat of the refrigerant in the suction line upstream of the liquid-suction heat exchanger is determined based on the sensed temperature and pressure of the refrigerant in the suction line upstream of the liquid-suction heat exchanger. Operating the refrigeration system in the second mode comprises controlling the expansion valve to bring a superheat of the refrigerant in the suction line downstream of the liquid-suction heat exchanger towards a second target superheat value or towards or within a second target range of superheat values, wherein the superheat of the refrigerant in the suction line downstream of the liquid-suction heat exchanger is determined based on the sensed temperature and pressure of the refrigerant in the suction line downstream of the liquid-suction heat exchanger.

LIST OF FIGURES

For a better understanding of the present application, and to show more clearly how the embodiments described herein may be carried into effect, reference will now be made, by way of example, to the accompanying drawings, in which:

FIG. 1 schematically shows a refrigeration system;

Figure 7:
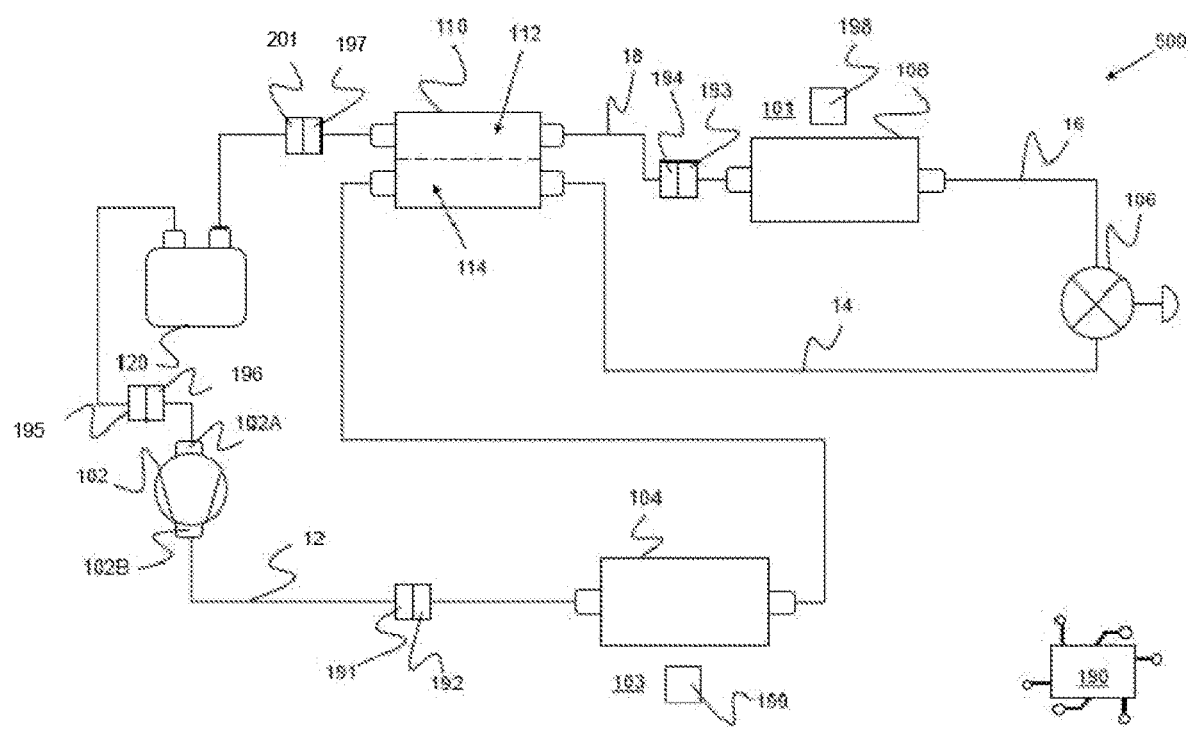
Figure 8:
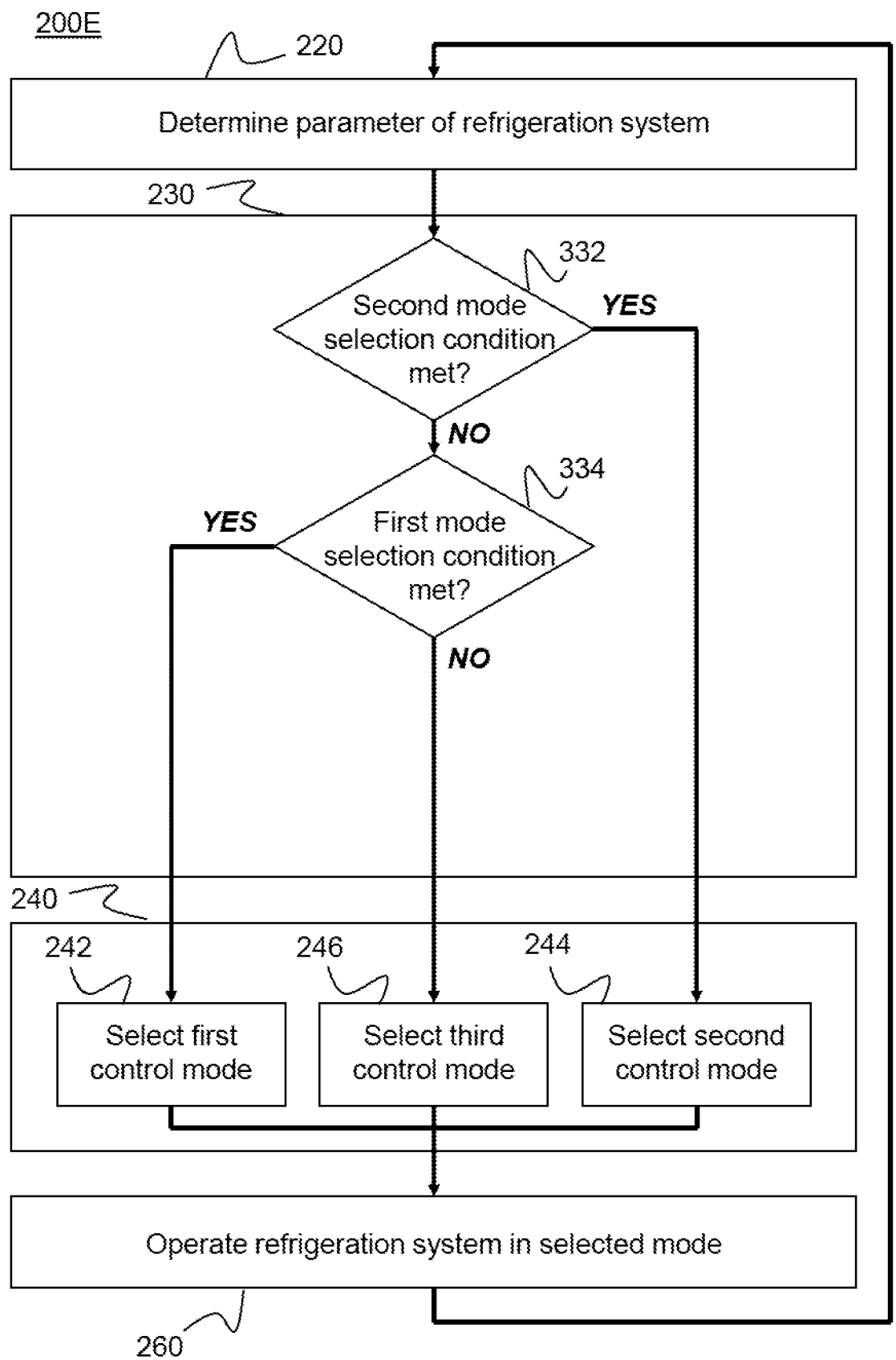
Figure 9:
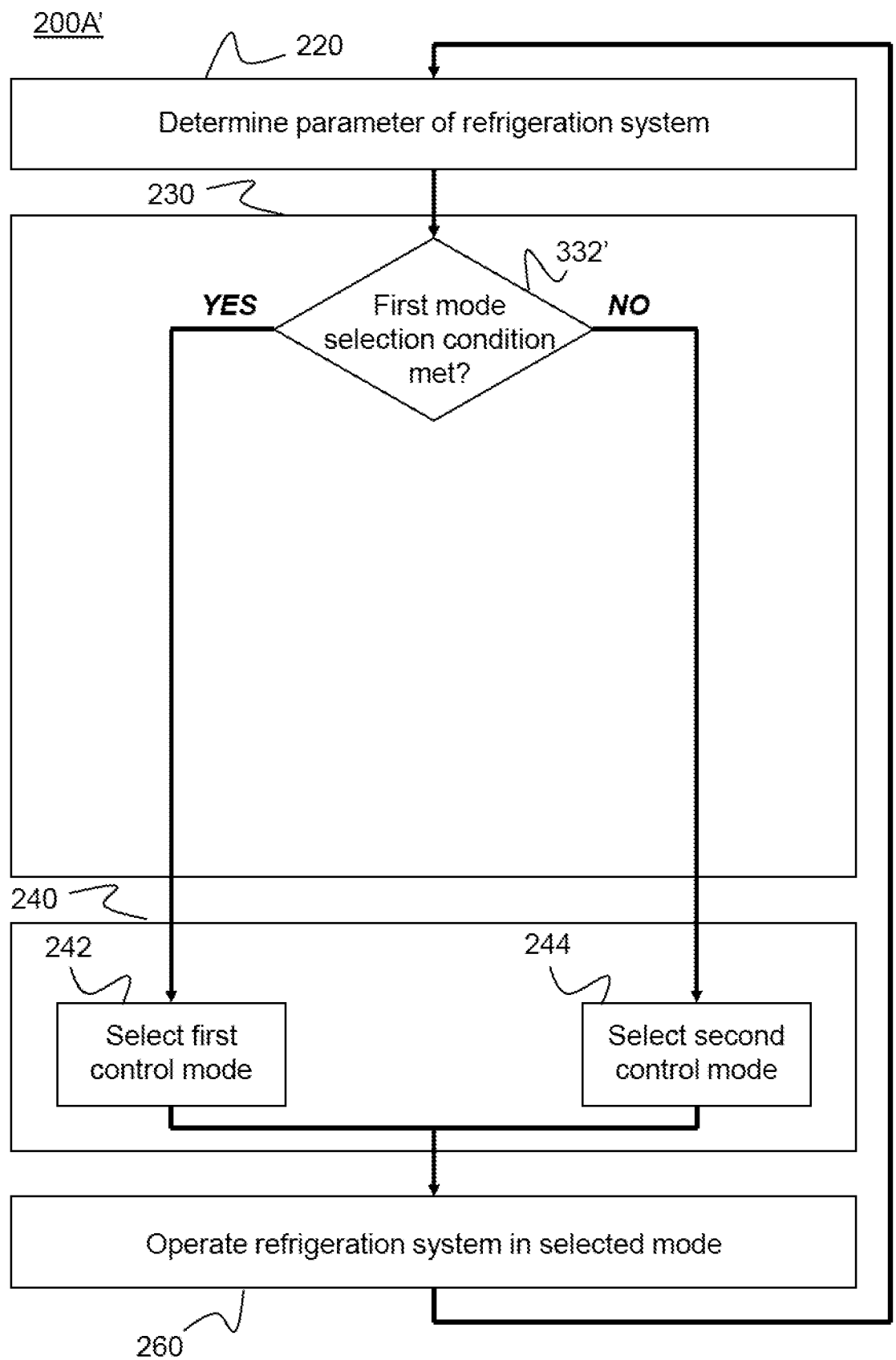
Figure 10:
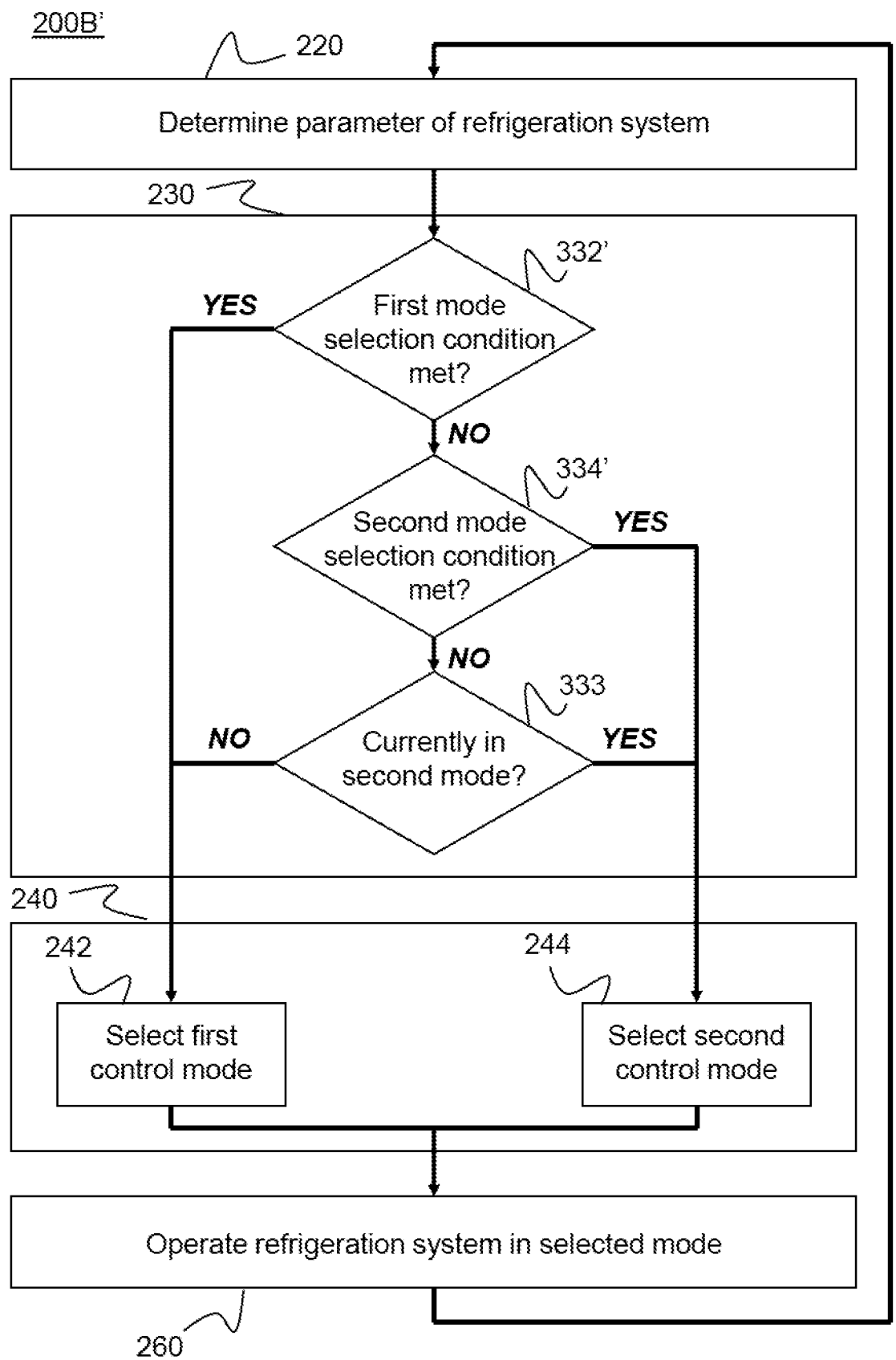
Figure 11:
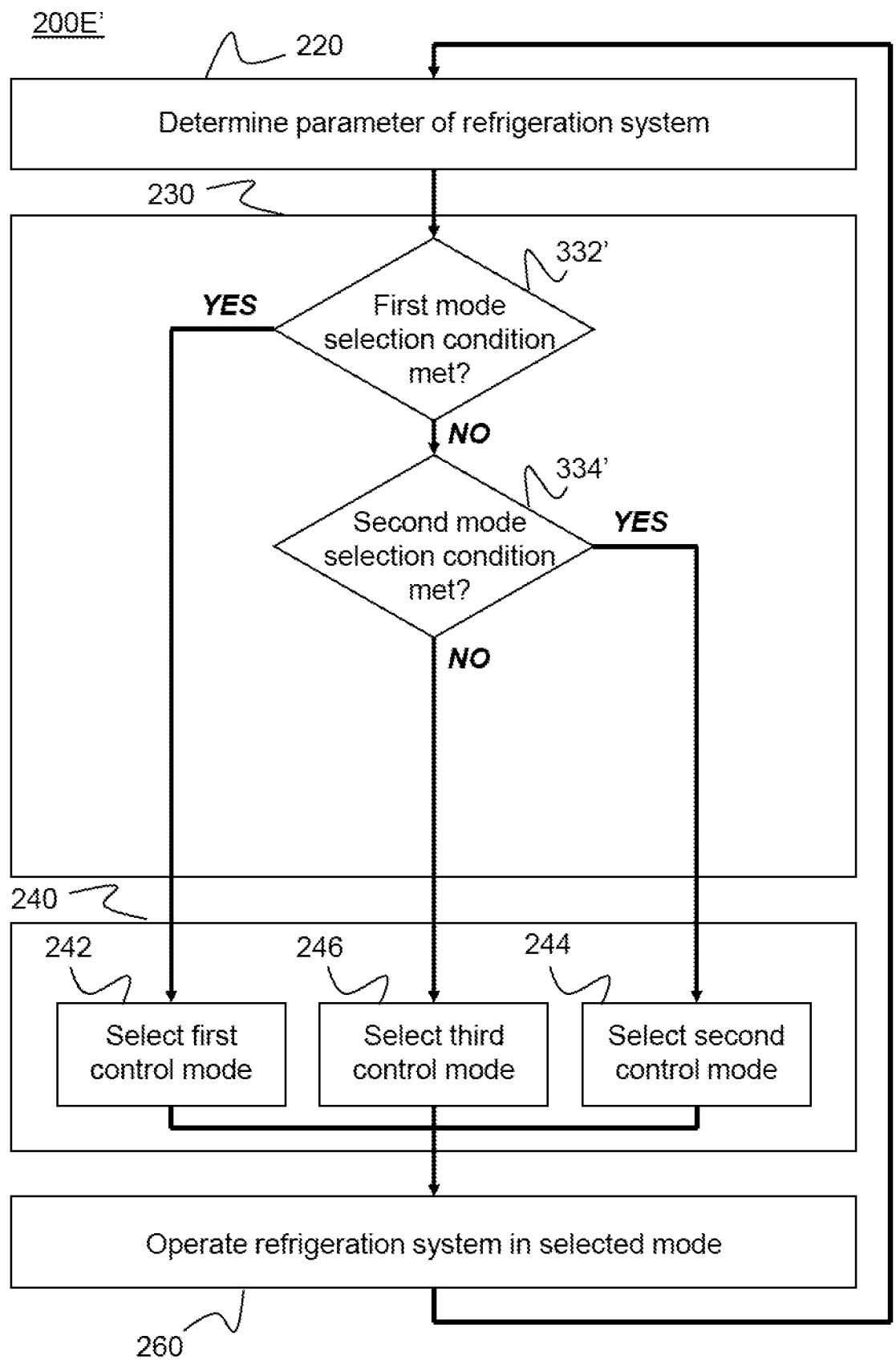

FIG. 7 schematically shows an alternative refrigeration system;

FIG. 8 is a flowchart of a method of operating the alternative refrigeration system;

FIG. 9 is a flowchart of an alternative first example implementation of the method of operating the refrigeration system;

FIG. 10 is a flowchart of an alternative second example implementation of the method of operating the refrigeration system; and FIG. 11 is a flowchart of an alternative method of operating the alternative refrigeration system.

DETAILED DESCRIPTION

Figure 1:
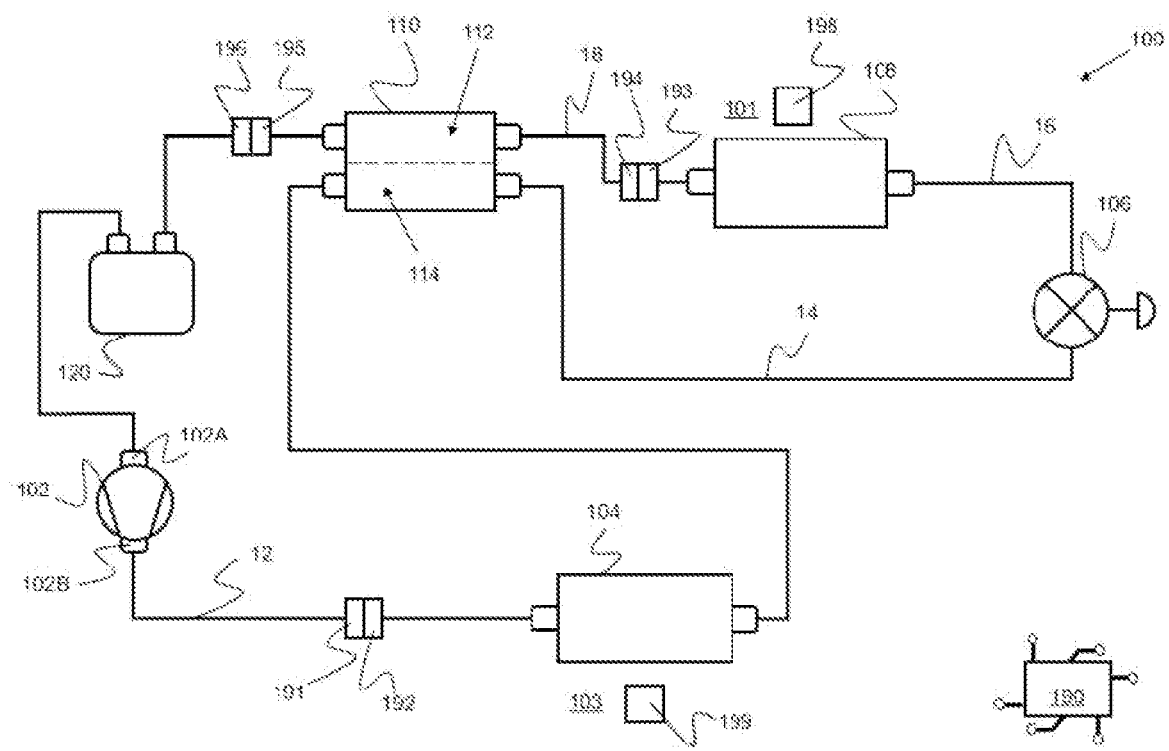

FIG. 1 schematically shows a refrigeration system 100 for transferring heat from one heat exchange medium to another, for example between a process medium 103 and an external medium 101. The refrigeration system 100 is a vapor compression system and comprises a compressor 102, a condenser 104, an expansion device 106 and an evaporator 108. The compressor 102 may be a scroll or screw compressor, for example. The expansion device 106 may be an electronic expansion valve, for example.

The condenser 104 is configured to reject heat from the refrigerant therein into the external medium 101. The external medium 101 may be ambient air. The evaporator 108 is configured to receive heat into the refrigerant therein from the process medium 103. The process medium 103 may be process fluid from another system such as a chiller system. The process medium 103 may otherwise be air within a climate-controlled space.

The compressor 102 and the condenser 104 are coupled by a discharge line 12 configured to convey refrigerant therebetween. The condenser 104 and the expansion device 106 are coupled by a liquid line 14 configured to convey refrigerant therebetween. The expansion device 106 and the evaporator 108 are coupled by a distributor line 16 configured to convey refrigerant therebetween. The evaporator 108 and the compressor 102 are coupled by a suction line 18 configured to convey refrigerant therebetween. The compressor 102 is configured to receive refrigerant from the suction line 18 at a compressor inlet port 102A and to discharge refrigerant into the discharge line 12 at a compressor outlet port 102B. The refrigerant may be a low GWP refrigerant. The GWP refrigerant may be an A2L refrigerant, for example.

The refrigeration system 100 further comprises a liquid-suction heat exchanger 110. The liquid-suction heat exchanger 110 includes a suction side 112 and a liquid side 114. The suction line 18 extends through the suction side 112 and the liquid line 14 extends through the liquid side 114. Accordingly, the suction side 112 is disposed in flow series between the evaporator 18 and the compressor 12, and the liquid side 114 is disposed in flow series between the condenser 14 and the expansion device 106. The liquid-suction heat exchanger 110 is configured to place refrigerant passing through the liquid side 114 in heat exchange relationship with refrigerant passing through the suction side 112. The liquid-suction heat exchanger 110 is generally optimised for sensible heating of refrigerant passing through the suction side 112 rather than evaporative (i.e. latent) heating of refrigerant passing through the suction side 112.

The refrigeration system 100 further comprises an accumulator tank 120. The suction line 18 extends through the accumulator tank 120. The accumulator tank 120 is disposed downstream of the liquid-suction heat exchanger 110 such that it is disposed in flow series between the liquid-suction heat exchanger 110 and the compressor 102. In alternative arrangements, the accumulator tank 120 may be omitted.

An upstream suction line pressure sensor 193 and an upstream suction line temperature sensor 194 are disposed along a portion of the suction line 18 upstream of the liquid-suction heat exchanger 110, between the evaporator 108 and the liquid-suction heat exchanger 110. The upstream suction line pressure and temperature sensors 193, 194 are configured to sense a pressure and temperature of the refrigerant in the suction line 18 upstream of the liquid-suction heat exchanger 110. A downstream suction line pressure sensor 195 and a downstream suction line temperature sensor 196 are disposed along a portion of the suction line 18 downstream of the liquid-suction heat exchanger 110, between the liquid-suction heat exchanger 110 and the compressor 102. The downstream suction line pressure and temperature sensors 195, 196 may be disposed immediately downstream of the liquid-suction heat exchanger 110. The downstream suction line pressure and temperature sensor 195, 196 are configured to sense a pressure and temperature of the refrigerant in the suction line 18 downstream of the liquid-suction heat exchanger 110. In particular, the downstream suction line pressure and temperature sensors 195, 196 are disposed along a portion of the suction line 18 between the liquid-suction heat exchanger 110 and the accumulator tank 120, and, therefore, are configured to sense a pressure and temperature of the refrigerant in the suction line 18 between the liquid-suction heat exchanger 110 and the accumulator tank 120. A discharge line pressure sensor 191 and a discharge line temperature sensor 192 are disposed along the discharge line 12. The discharge line pressure and temperature sensors 191, 192 are configured to sense a pressure and temperature of the refrigerant in the discharge line 12.

The refrigeration system 100 further comprises a process medium temperature sensor 198 and an external medium temperature sensor 199. The process medium temperature sensor 198 is disposed in the process medium 103 and configured to sense a temperature of the process medium 103. If the process medium 103 is air within a climate controlled space, the process medium temperature sensor 198 may be referred to as a return air sensor. The external medium temperature sensor 199 is disposed in the external medium 101 and configured to sense a temperature of the external medium 101.

The refrigeration system 100 further comprises a controller 190. The controller 190 is configured to receive signals outputted by the sensors indicative of the sensed characteristics of the refrigeration system 100 and operate the refrigeration system 100 in accordance with the methods described below.

During operation of the refrigeration system 100, the refrigerant in gaseous form is compressed by the compressor 102 to a high pressure and high temperature gaseous refrigerant. The refrigerant passes from the compressor 102 to the condenser 104 via the discharge line 12. The condenser 104 condenses the refrigerant to reject heat to the external medium 101 so as to form high pressure and high temperature condensed (i.e. liquid) refrigerant. Although not shown, the refrigeration system 100 may comprise a fan that blows hot air from the condenser 104 away from the condenser 104, thereby increasing the rate of heat rejection. The high pressure and high temperature condensed refrigerant passes along the liquid line 14 from the condenser 104 to the expansion device 106 via the liquid side 114 of the liquid-suction heat exchanger 110. The condensed refrigerant is expanded at the expansion device 106 to produce a multi-phase, low temperature, low pressure refrigerant flow. The multi-phase, low temperature, low pressure refrigerant flow passes from the expansion device 106 to the evaporator 108 via the distributor line 16. The refrigerant flow is evaporated in the evaporator 108, which cools the process medium 103. That is, heat travels from the process medium 103 to the evaporator 108. The evaporation process heats the refrigerant flow as it passes through the evaporator 108. The refrigerant passes along the suction line 16 from the evaporator 108 to the compressor 102 via the suction side 112 of the liquid-suction heat exchanger 110 and the accumulator tank 120. As the refrigerant passes through the suction side 112 of the liquid-suction heat exchanger 110, it receives heat from refrigerant passing through the liquid side 114 of the liquid-suction heat exchanger 110. Accordingly, the refrigerant is heated as it passes through the suction side 112 of the liquid-suction heat exchanger 110 and is cooled as it passes through the liquid side 114 of the liquid-suction heat exchanger 110. As the refrigerant passes through the accumulator tank 120, liquid refrigerant droplets are removed from the refrigerant flow within the suction line 18, which reduces the risk of liquid slugging in the compressor Once the refrigerant returns to the compressor 102, the above-mentioned process is repeated.

The controller 190 is configured to determine the superheat of the refrigerant in the suction line 18 upstream of the liquid-suction heat exchanger 110 based on the temperature and pressure sensed by the upstream suction line temperature and pressure sensors 194, 193. This may be done using methods that will be apparent to those skilled in the art. For example, the controller 190 may determine the superheat by converting the pressure sensed by the upstream suction line pressure sensor 193 into a temperature using a pressure/temperature comparator and then subtracting this temperature from the temperature sensed by the upstream suction line temperature sensor 194.

The controller 190 is also configured to determine the superheat of the refrigerant in the suction line 18 downstream of the liquid-suction heat exchanger 110 based on the temperature and pressure sensed by the downstream suction line temperature and pressure sensors 196, 195. This again may be done using methods that will be apparent to those skilled in the art. For example, the controller 190 may determine the superheat by converting the pressure sensed by the downstream suction line pressure sensor 195 into a temperature using a pressure/temperature comparator and then subtracting this temperature from the temperature sensed by the downstream suction line temperature sensor 196.

The controller 190 is configured to operate the refrigeration system 100 in either a first mode or a second mode.

In the first mode, the expansion valve 106 is controlled based on the superheat of the refrigerant in the suction line 18 upstream of the liquid-suction heat exchanger 110 (i.e. as determined using the upstream suction line temperature and pressure sensors 194, 193). This corresponds to the superheat at the outlet of the evaporator 108 and may be referred to as the evaporator outlet superheat (abbreviated as EVOSH). Operation of the refrigeration system 100 in the first mode may involve controlling the expansion valve 106 to bring the superheat of the refrigerant upstream of the liquid-suction heat exchanger 110 towards a target superheat value or towards or within a range of superheat values. In particular, the controller 190 can control the expansion device 106 to increase the extent by which it is open if the superheat of the refrigerant upstream of the liquid-suction heat exchanger 110 is greater than a target superheat (or range of target superheat values) and reduce the extent by which it is open if the superheat of the refrigerant upstream of the liquid-suction heat exchanger 110 is less than a target superheat (or range of target superheat values).

The value of the target superheat in the first mode is set such that during operation of the refrigeration system 100 in the first mode, the refrigerant in the suction line 18 upstream of the liquid-suction heat exchanger 110 is superheated and completely vapour. Accordingly, only sensible heating of refrigerant takes place within the suction side 112 of the liquid-suction heat exchanger 110. Since the liquid-suction heat exchanger 110 is optimised for sensible heating of refrigerant within the suction side 112 (rather than evaporative heating), operation of the refrigeration system 100 in the first mode ensures that the heat transfer efficiency within the liquid-suction heat exchanger 110 and the overall capacity of the refrigeration system 100 are maintained at a satisfactory level. In addition, operation of the refrigeration system 100 in the first mode reduces the risk of two-phase liquid-gaseous refrigerant being provided to the inlet port 102A of the compressor 102, and, thus, reduces the risk of liquid slugging in the compressor 102.

In the second mode, the expansion valve 106 is controlled based on the superheat of refrigerant in the suction line 18 downstream of the liquid-suction heat exchanger 110 (i.e. as determined using the downstream suction line temperature and pressure sensors 196, 195). This corresponds to the superheat at the outlet of the liquid-suction heat exchanger 110 and may be referred to as the heat exchanger vapour outlet superheat (abbreviated as HVOSH). Operation of the refrigeration system 100 in the second mode may involve controlling the expansion valve 106 to bring the superheat of the refrigerant downstream of the liquid-suction heat exchanger 110 towards a target superheat value or towards or within a range of superheat values. In particular, the controller 190 can control the expansion device 106 to increase the extent by which it is open if the superheat of the refrigerant downstream of the liquid-suction heat exchanger 110 is greater than a target superheat (or range of target superheat values) and reduce the extent by which it is open if the superheat of the refrigerant downstream of the liquid-suction heat exchanger 110 is less than a target superheat (or range of target superheat values).

The value of the target superheat in the second mode is set such that during operation of the refrigeration system 100 in the second mode, the refrigerant in the suction line 18 upstream of the liquid-suction heat exchanger 110 is less than saturation temperature, is not superheated and is not completely vapour. Accordingly, both evaporative heating (i.e. latent heating) and sensible heating of refrigerant take place within the suction side 112 of the liquid-suction heat exchanger 110. Operation of the refrigeration system 100 in the second mode ensures that the superheat (and therefore the temperature) of refrigerant provided to the compressor 102 is lower than if the refrigeration system 100 were operated in the first mode under comparable operating conditions. This is beneficial since it reduces the risk of damage to the compressor 102. This may be particularly beneficial if low GWP refrigerants are being used. In particular, typical thermodynamic characteristics of low GWP refrigerants may be more likely to result in excessively high discharge line refrigerant temperatures. In particular, it may be that use of a refrigeration system 100 charged with a low GWP refrigerant results in a lower mass flow rate of refrigerant around the refrigeration system 100 while a power demand of the refrigeration system 100 remains approximately constant. For this reason, it may be that the required compressor pressure ratio of a refrigeration system 100 charged with a low GWP refrigerant is required to be relatively high, which leads to an increased discharge line refrigerant temperature. Further, low GWP refrigerants have a higher heat of compression, which results in an increased discharge line refrigerant temperature. Operation of the refrigeration system 100 in the second mode does not have any substantial effect on the compressor pressure ratio, a reduction of which would reduce the effectiveness of operation of the refrigeration system 100.

The target superheat value or target range of superheat values may be the same in the first mode and the second mode. Alternatively, the target superheat value or target range of superheat values may be different in the first mode and the second mode. The target superheat value or target range of superheat values may be a predetermined target superheat value or predetermined target range of superheat values. Alternatively, the target superheat value or target range of superheat values may be a variable target superheat value or variable target range of superheat values. In both the first and second modes, the target superheat value or target range of superheat values may be in the range of 1° C. to 8° C. By way of another example, the target superheat value or target range of superheat values may be in the range of 4° C. to 6° C. By way of another example, the target superheat value may be 5° C.

Figure 2:
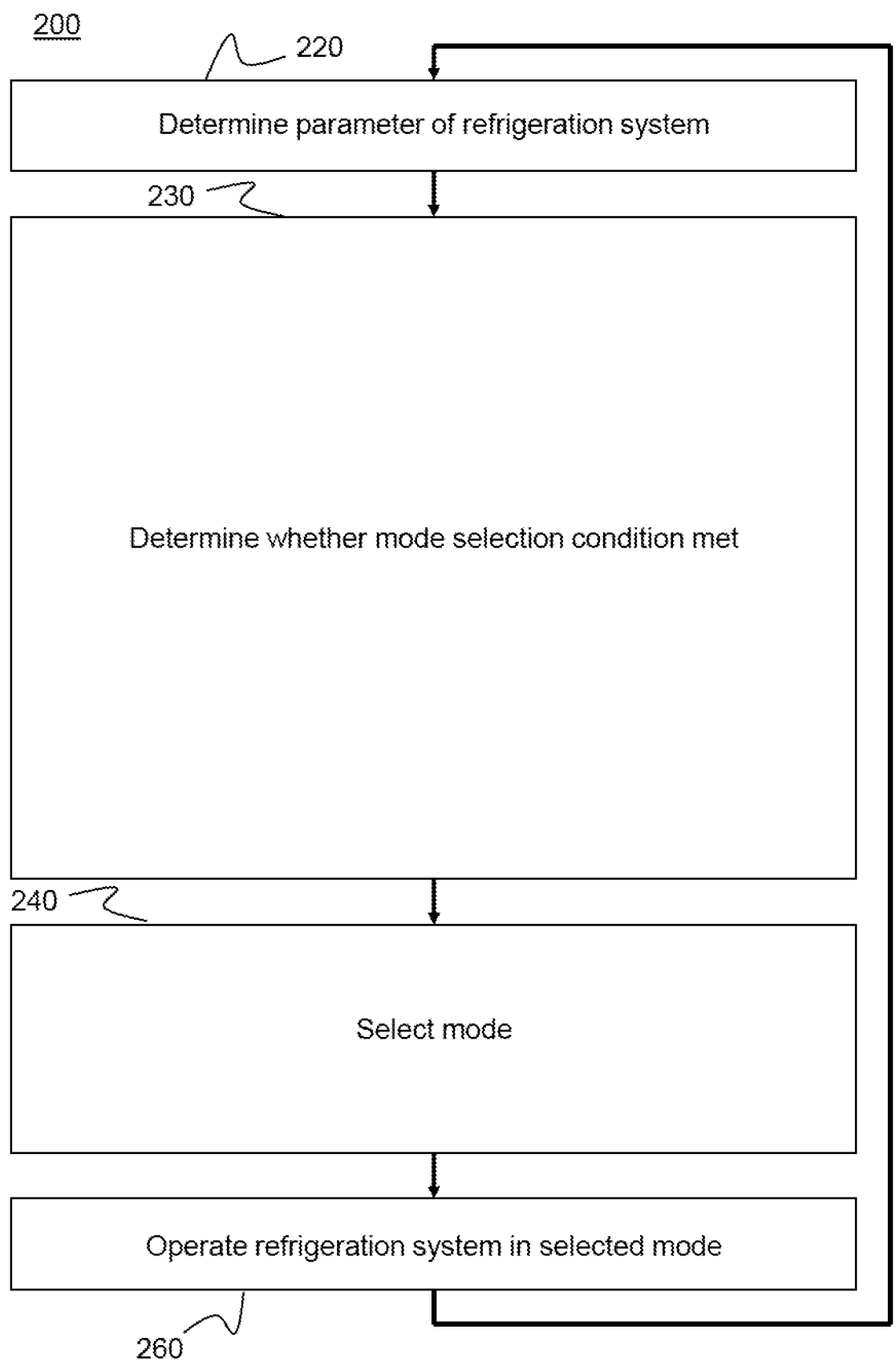
FIG. 2 is a flowchart of a method of operating the refrigeration system.

FIG. 2 shows a flowchart of a method 200 of operating the refrigeration system 100. In step 220 of the method 200, the controller 190 determines a parameter of the refrigeration system 100. The method 200 then proceeds to step 230. In step 230, the controller 190 determines whether a first mode selection condition has been met and/or whether a second mode selection condition has been met. The method 200 then proceeds to step 240. In step 240, the controller 190 selects 230 one of a first mode and a second mode based on whether the first mode selection condition has been met and/or whether the second mode selection condition has been met. The method 200 then proceeds to step 260. In step 260, the controller 190 operates the refrigeration system 100 in the selected mode (i.e. either the first mode or the second mode selected in step 240). Following step 260, the method returns to step 220 such that the abovementioned process may be repeated.

Figure 3:
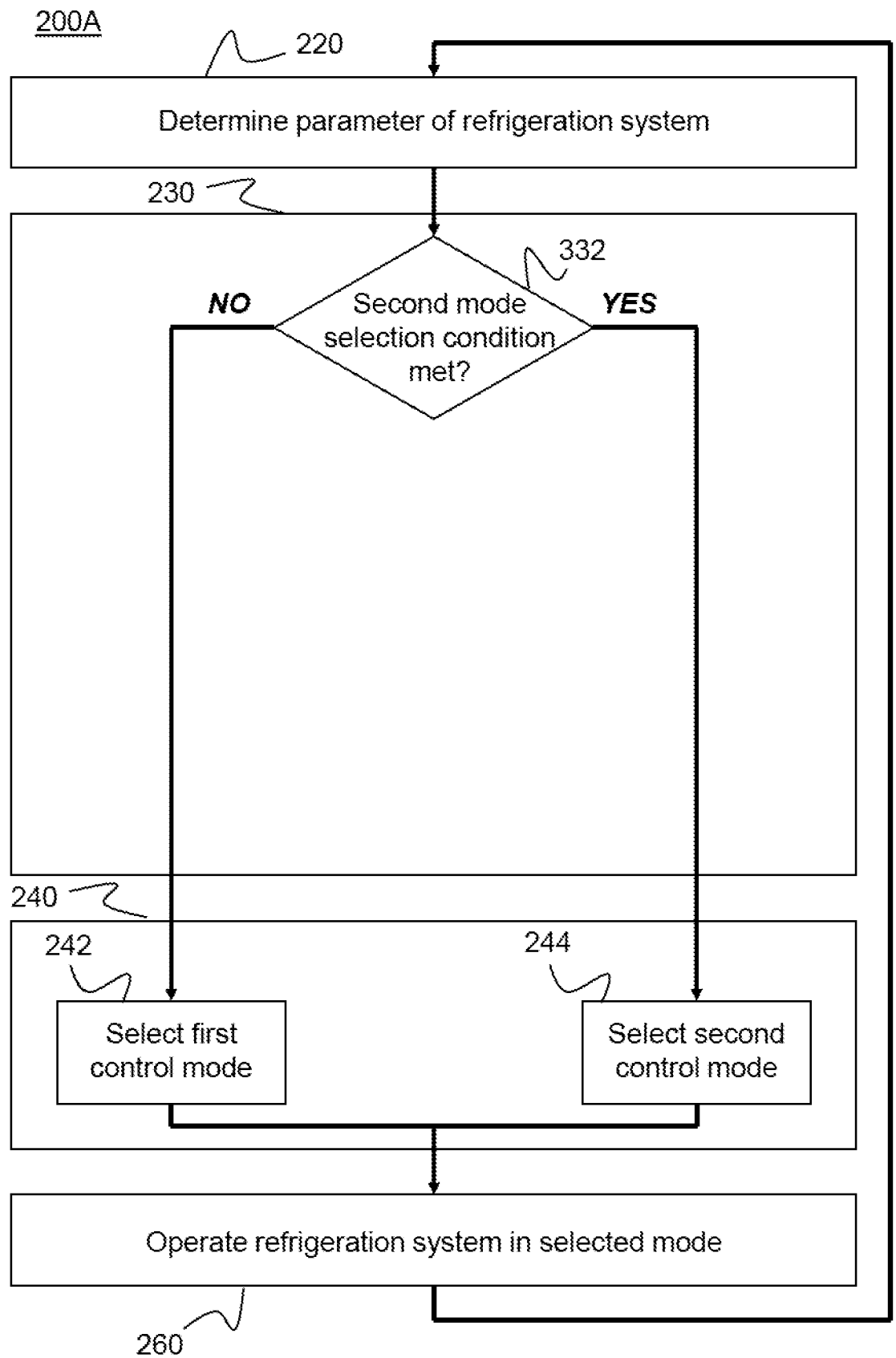
FIG. 3 is a flowchart of a first example implementation of the method of operating the refrigeration system.

FIG. 3 shows a flowchart of a first example implementation 200A of the method 200. In the first example implementation 200A, the step 230 comprises a step 332 of determining whether a second mode selection condition is met. Step 240 comprises a first step 242 and a second step 244. If it is determined in step 332 that the second mode selection condition has been met, the method 200A proceeds to step 244 where the second mode is selected. If it is determined in step 332 that the second mode selection condition has not been met, the method 200A proceeds to step 242 where the first mode is selected.

The second mode selection condition may be different in different specific aspects. A number of selection mode conditions that may be used in step 332 in different specific aspects are described below.

In a first specific aspect, the controller 190 is configured to determine (i.e. in step 220) the temperature of the refrigerant within the discharge line 12 directly based on the output of the discharge line temperature sensor 192. Accordingly, the parameter of the refrigeration system 100 is a sensed temperature of the refrigerant within the discharge line 12. The second mode selection condition is determined to have been met when the sensed temperature of the refrigerant within the discharge line 12 is greater than a threshold temperature value. The temperature threshold value may be set at a value that ensures the temperature of refrigerant within the discharge line 12 is kept sufficiently low to avoid or reduce a risk of damage to the compressor 102. For example, it may be that the temperature threshold value is a value between 130° C. and 150° C. inclusive. More preferably, the temperature threshold value may be between 135° C. and 145° C. inclusive. Even more preferably, the temperature threshold value may be 140° C.

In a second specific aspect, the controller 190 is configured to calculate (i.e. in step 220) the temperature of refrigerant within the discharge line 12 indirectly using a mathematical equation. The mathematical equation relates the operating parameters of the refrigeration system 100 to the temperature of refrigerant within the discharge line 12. The mathematical equation may use an operating speed of the compressor 102, a temperature of refrigerant within the suction line 18 (e.g. as sensed by the upstream suction line temperature sensor 194 and/or the downstream suction line temperature sensor 196), a pressure of refrigerant within the suction line 18 (e.g. as sensed by the upstream suction line pressure sensor 193 and/or the downstream suction line pressure sensor 195) and a pressure of refrigerant within the discharge line 12 (e.g. as sensed by the discharge line pressure sensor 191) as inputs to calculate the temperature of the refrigerant within the discharge line 12. Accordingly, the parameter of the refrigeration system 100 is a calculated temperature of the refrigerant within the discharge line 12. Implementation of the second specific aspect avoids the need for a discharge line temperature sensor 192. In a similar manner to the first specific aspect, in the second specific aspect, the second mode selection condition is determined to have been met when the calculated temperature of the refrigerant within the discharge line 12 is greater than a threshold temperature value. The threshold temperature value may be as described above with reference to the first specific aspect.

In a third specific aspect, the controller 190 is configured to determine (i.e. in step 220) the temperature of refrigerant within the discharge line 12 indirectly using a predetermined model of the refrigeration system 100. The predetermined model of the refrigeration system 100 may be a metamodel of the refrigeration system 100. The metamodel may have the sensed temperature of the process medium 103, the sensed temperature of the process medium 103, the positions of valves within the refrigeration system 100 used for controlling a flow of the refrigerant, and the speed of the compressor 102 as inputs. Based on the inputs, the metamodel may model the refrigeration system 100 including the estimated temperature of the refrigerant within the discharge line 12. Accordingly, the parameter of the refrigeration system 100 is an estimated temperature of the refrigerant within the discharge line 12. In a similar manner to the first specific aspect, in the third specific aspect, the second mode selection condition is determined to have been met when the estimated temperature of the refrigerant within the discharge line 12 is greater than a threshold temperature value. The threshold temperature value may be as described above with reference to the first and second specific aspects.

In a fourth specific aspect, the controller 190 is configured to determine (i.e. in step 220) the compressor pressure ratio across the compressor 102. The pressure ratio is the ratio of the pressure of the refrigerant provided to the compressor 102 to the pressure of the refrigerant discharged from the compressor 102. The pressure of the refrigerant provided to the compressor 102 may be determined based on the output of a sensor (not shown) located at the inlet port 102A of the compressor 102 and the pressure of the refrigerant discharged from the compressor 102 may be determined based on the output of a sensor (not shown) located at the outlet port 102A of the compressor 102. Alternatively, the pressure of the refrigerant provided to the compressor 102 may be determined based on the output of the downstream suction line pressure sensor 195 and the pressure of the refrigerant discharged from the compressor 102 may be determined based on the output of the discharge line pressure sensor 191. The compressor pressure ratio may otherwise be determined using means which will be apparent to those skilled in the art. Accordingly, the parameter of the refrigeration system 100 is a pressure ratio of the compressor 102. In the fourth specific aspect, the second mode selection condition is determined to have been met when the compressor pressure ratio is greater than a compressor pressure ratio threshold. The compressor pressure ratio threshold may be set at a value that corresponds to a compressor pressure ratio above which the temperature of refrigerant within the discharge line 12 is or is likely to become excessive. The compressor pressure ratio threshold may be set based on the thermodynamic characteristics of refrigerant with which the refrigeration system 100 is charged. It may be that the compressor pressure ratio threshold is a value between 11 and 15 inclusive. More preferably, the compressor pressure ratio threshold is a value between 12 and 14 inclusive. Even more preferably, the compressor pressure ratio threshold is 13.

In a fifth specific aspect, the controller 190 is configured to determine (i.e. in step 220) the process medium temperature and the external medium temperature based on the outputs of the process medium temperature sensor 198 and the external medium temperature sensor 199, respectively. Accordingly, a first parameter of the parameters of the refrigeration system 100 determined by the controller 190 is a temperature of a process medium 103 and a second parameter of the parameters of the refrigeration system 100 determined by the controller 190 is a temperature of an external medium 101. The second mode selection condition is determined to have been met when the external medium temperature is greater than an external medium temperature threshold or when the process medium temperature is less than a process medium temperature threshold (i.e. if either of these conditions are met). The values of the external medium temperature threshold and the process medium temperature threshold may be set at values above and below which the refrigeration system 100 would or would be likely to otherwise experience an excessively high discharge line temperature. By way of example, the external medium temperature threshold may be 30° C. and the process medium temperature threshold may be −20° C. It will however be appreciated that other values may be used for the external medium temperature threshold and the process medium temperature threshold.

Figure 4:
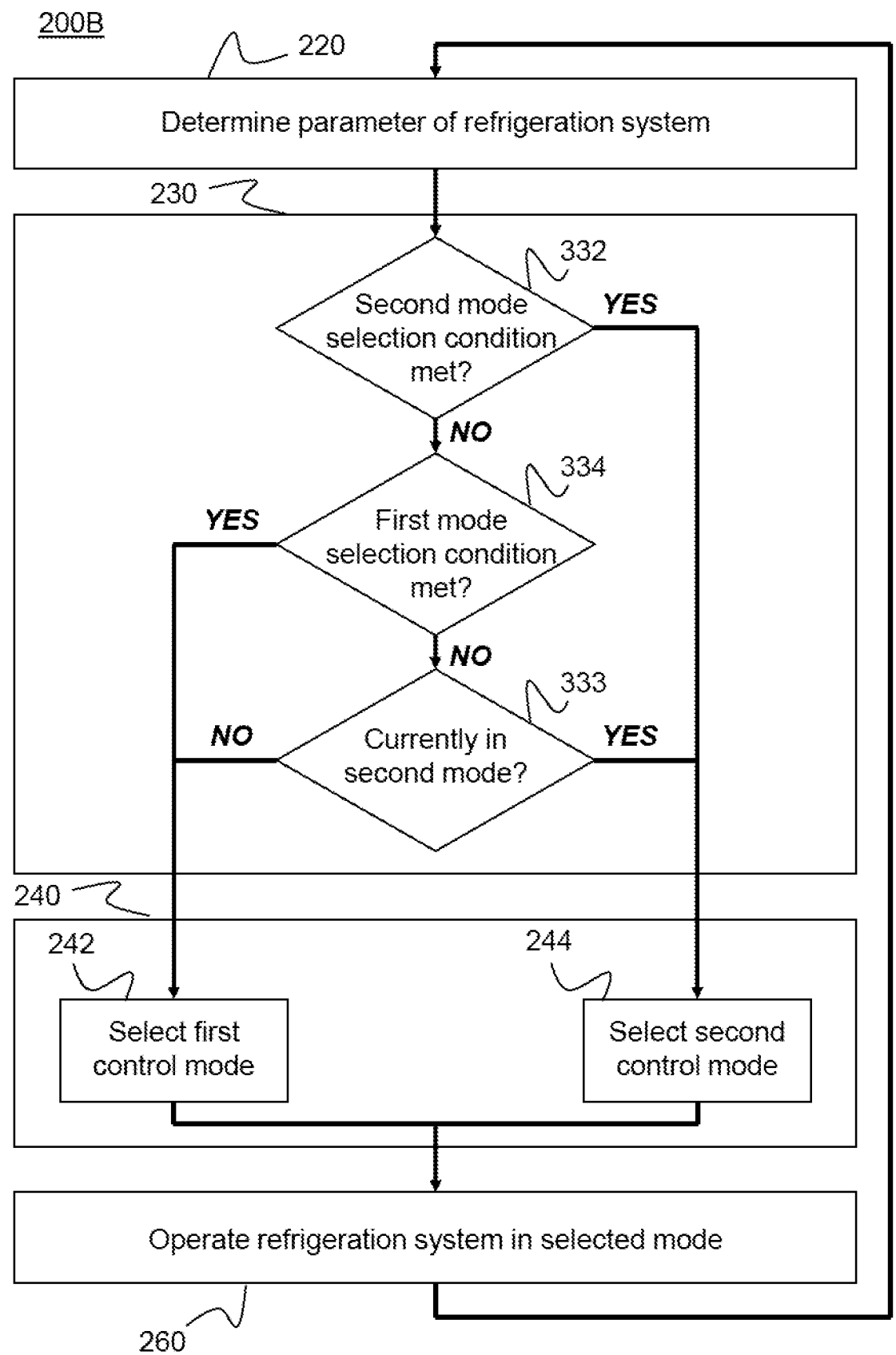
FIG. 4 is a flowchart of a second example implementation of the method of operating the refrigeration system.

FIG. 4 shows a flowchart of a second example implementation 200B of the method 200. The second example implementation 200B of the method 200 generally corresponds to the first example implementation 200A of the method 200 described above, with like reference numerals indicating common or similar features. In the second example implementation of the method 200B, the second mode selection condition may be any of those described above in relation the first to fifth specific aspect. However, in the second example implementation, step 230 comprises an additional step 334 and an additional step 333. Step 334 occurs if it is determined in step 332 that the second mode selection condition is not met. Step 334 comprises determining whether a first mode selection condition is met. If it is determined in step 334 that the first mode selection condition has been met, the method 200B proceeds to step 242 where the first mode is selected. If it is determined in step 334 that the first mode selection condition has not been met (i.e. that neither the second mode selection condition nor the first mode selection condition have been met), the method 200B proceeds to step 333. Step 333 comprises determining whether the refrigeration system 100 is currently operating in the second mode. If it is determined in step 333 that the refrigeration system 100 is not currently operating in the second mode, the method 200B proceeds to step 242 where the first mode is selected. If it is determined in step 333 that the refrigeration system 100 is currently operating in the second mode, the method 200B proceeds to step 244 where the second mode is selected.

As described above, it may be that operation of the refrigeration system 100 in the second mode has the effect of reducing the discharge line refrigerant temperature. The additional steps of the second example implementation ensure that the refrigeration system 100 does not switch back to operating in the first mode of operation shortly after the refrigeration system 100 begins operating in the second mode, and vice versa. The features of the second example implementation may therefore reduce a likelihood of unstable switching between the first mode and the second mode during operation of the refrigeration system 100.

The first mode selection condition may be different in different specific aspects. A number of selection mode conditions that may be used in step 334 in different specific aspects are described below.

For example, the first mode selection condition may be determined to have been met when a sensed temperature of the refrigerant within the discharge line 12 (determined in accordance with the first specific aspect described above) is less than a threshold temperature value. In such implementations, if the parameter used to determine whether the first mode selection condition and the second mode selection condition are the same (i.e. if the second mode selection condition is determined to have been met when the sensed temperature of the refrigerant within the discharge line 12 is greater than a threshold temperature value), the first mode selection condition is determined to have been met when the sensed temperature of the refrigerant within the discharge line 12 is less than a threshold temperature value that is lower than the threshold value used to determine whether the second mode selection condition has been met.

Alternatively, the first mode selection condition may be determined to have been met when a calculated temperature of the refrigerant within the discharge line 12 (determined in accordance with the second specific aspect described above) is less than a threshold temperature value. In such implementations, if the parameter used to determine whether the first mode selection condition and the second mode selection condition are the same (i.e. if the second mode selection condition is determined to have been met when the calculated temperature of the refrigerant within the discharge line 12 is greater than a threshold temperature value), the first mode selection condition is determined to have been met when the calculated temperature of the refrigerant within the discharge line 12 is less than a threshold temperature value that is lower than the threshold value used to determine whether the second mode selection condition has been met.

Alternatively, the first mode selection condition may be determined to have been met when an estimated temperature of the refrigerant within the discharge line 12 (determined in accordance with the third specific aspect described above) is less than a threshold temperature value. In such implementations, if the parameter used to determine whether the first mode selection condition and the second mode selection condition are the same (i.e. if the second mode selection condition is determined to have been met when the estimated temperature of the refrigerant within the discharge line 12 is greater than a threshold temperature value), the first mode selection condition is determined to have been met when the estimated temperature of the refrigerant within the discharge line 12 is less than a threshold temperature value that is lower than the threshold value used to determine whether the second mode selection condition has been met.

In the above examples, the first temperature threshold value for the first mode selection condition may be a value between 110° C. and 130° C. inclusive. More preferably, the first temperature threshold value may be between 115° C. and 125° C. inclusive. Even more preferably, the temperature threshold value may be 120° C. In the above examples, the second temperature threshold value for the second mode selection condition may be a value between 130° C. and 150° C. inclusive. More preferably, the second temperature threshold value may be between 135° C. and 145° C. inclusive. Even more preferably, the second temperature threshold value may be 140° C. In the above examples, if both parameters (i.e. for both the second mode selection condition and the first mode selection condition) are temperatures, the difference between the temperature thresholds may be between 5° C. and 30° C. More preferably, the difference between the first discharge line temperature threshold and the second discharge line temperature threshold may be approximately 20° C. By providing first and second discharge line temperature thresholds with the abovementioned difference in values, the refrigeration system 100 is not operated in the second mode for a longer time period than is necessary and unstable switching between the first mode and the second mode is prevented.

The first mode selection condition may alternatively be determined to have been met when a compressor pressure ratio (determined in accordance with the fourth specific aspect described above) is less than a compressor pressure ratio threshold. It may be that the compressor pressure ratio threshold for the first mode threshold is a value between 8 and 11 inclusive. More preferably, the compressor pressure ratio threshold is a value between 9 and 10 inclusive. Even more preferably, the compressor pressure ratio threshold is 9.5. In such implementations, if the parameter used to determine whether the first mode selection condition and the second mode selection condition are the same (i.e. if the second mode selection condition is determined to have been met when the compressor pressure ratio is greater than a compressor pressure ratio threshold), the first mode selection condition is determined to have been met when the compressor pressure ratio is less than a compressor pressure ratio threshold that is lower than the threshold value used to determine whether the second mode selection condition has been met.

Alternatively, the first mode selection condition may be determined to have been met when the external medium temperature (determined in accordance with the fifth specific aspect described above) is less than an external medium temperature threshold and when the process medium temperature (determined in accordance with the fifth specific aspect described above) is greater than a process medium temperature threshold (i.e. if both of these conditions are met). It may be that the external medium temperature threshold for the first mode is 20° C. and the process medium temperature threshold for the first mode is −20° C., for example. It will however be appreciated that other values may be used for the external medium temperature threshold and the process medium temperature threshold. In such implementations, if the parameter used to determine whether the first mode selection condition and the second mode selection condition are the same, the first mode selection condition is determined to have been met when the external medium temperature is less than an external medium temperature threshold that is lower than the threshold value used to determine whether the second mode selection condition has been met and when the process medium temperature is greater than a process medium temperature threshold that is higher than the threshold value used to determine whether the second mode selection condition has been met.

It will be appreciated that any combination of the first and second mode selection conditions discussed above can be used in the second example implementation shown in FIG. 4. By way of example only, the second mode selection condition may be determined to have been met when the sensed temperature of the refrigerant within the discharge line 12 is greater than a threshold temperature value and the first mode selection condition may be determined to have been met when a compressor pressure ratio is less than a compressor pressure ratio threshold. Accordingly, a first parameter of the parameters of the refrigeration system 100 determined by the controller 190 is a pressure ratio of the compressor 102 and a second parameter of the parameters of the refrigeration system 100 determined by the controller 190 is a sensed temperature of the refrigerant within the discharge line 12. As described above, operation of the refrigeration system 100 in the second mode has the effect of reducing the temperature of refrigerant within the discharge line 12 but does not have any substantial effect on the compressor pressure ratio. However, the temperature of refrigerant within the discharge line 12 is a function of compressor pressure ratio. Accordingly, switching back from the second mode to the first mode while the compressor pressure ratio remains high is likely to lead to unstable switching between the first mode and the second mode during execution of the method 200B, which this example combination of the second and first mode selection condition avoids.

Figure 5:
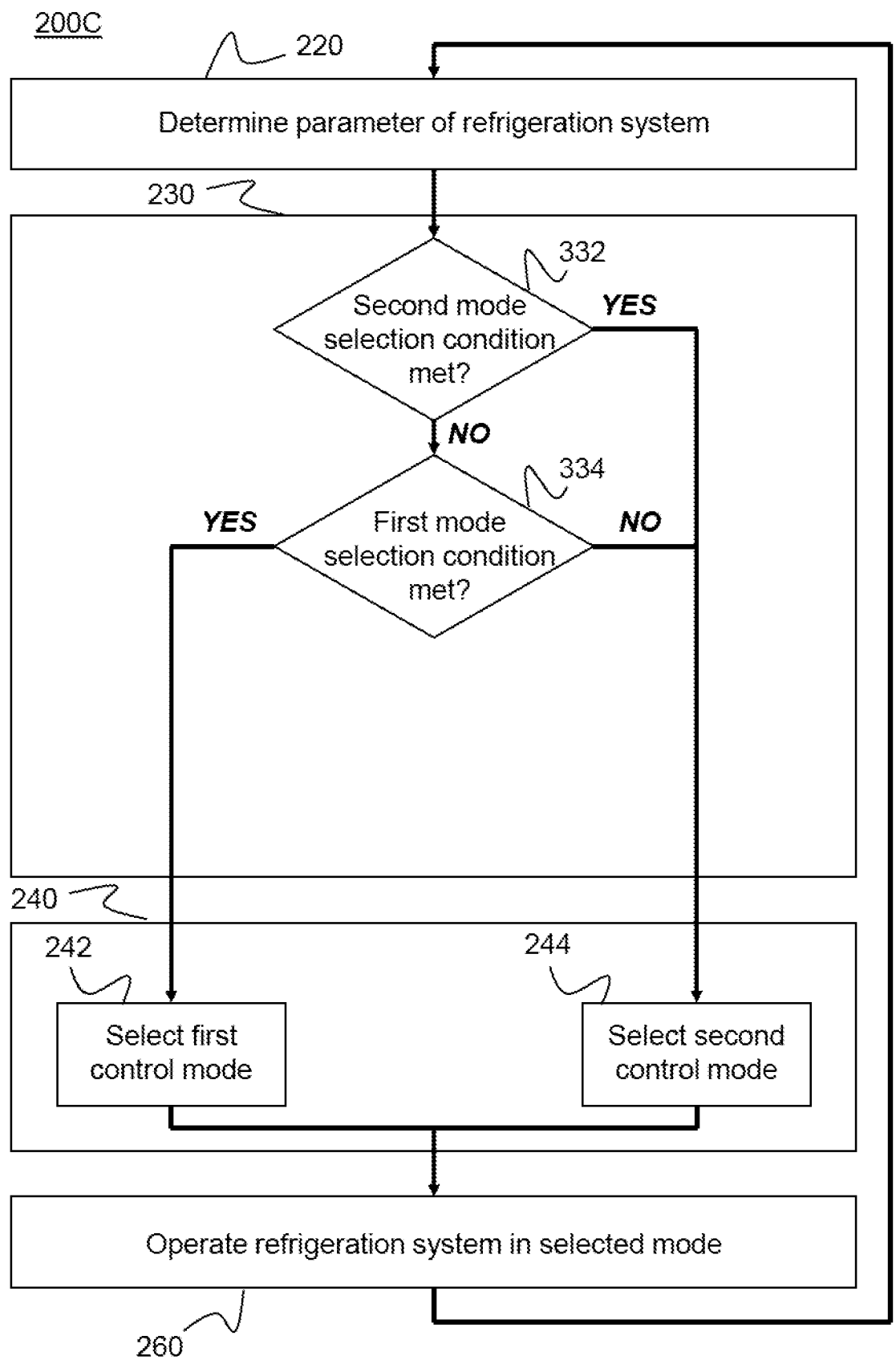
FIG. 5 is a flowchart of a third example implementation of the method of operating the refrigeration system.

FIG. 5 shows a flowchart of a third example implementation 200C of the method 200. The third example implementation 200C of the method 200 generally corresponds to the second example implementation 200B of the method 200 described above, with like reference numerals indicating common or similar features. However, in the third example implementation 200C of the method 200C, if neither the second mode selection nor the first mode selection condition have been met, the refrigeration system 100 is operated in the second control mode. In particular, in the third example implementation of the method 200C, if it is determined in step 334 that the first mode selection condition has not been met, the method 200C proceeds to step 244 where the second control mode is selected.

Again, it will be appreciated that any combination of the first and second mode selection conditions discussed above can be used in the third example implementation 200C.

Figure 6:
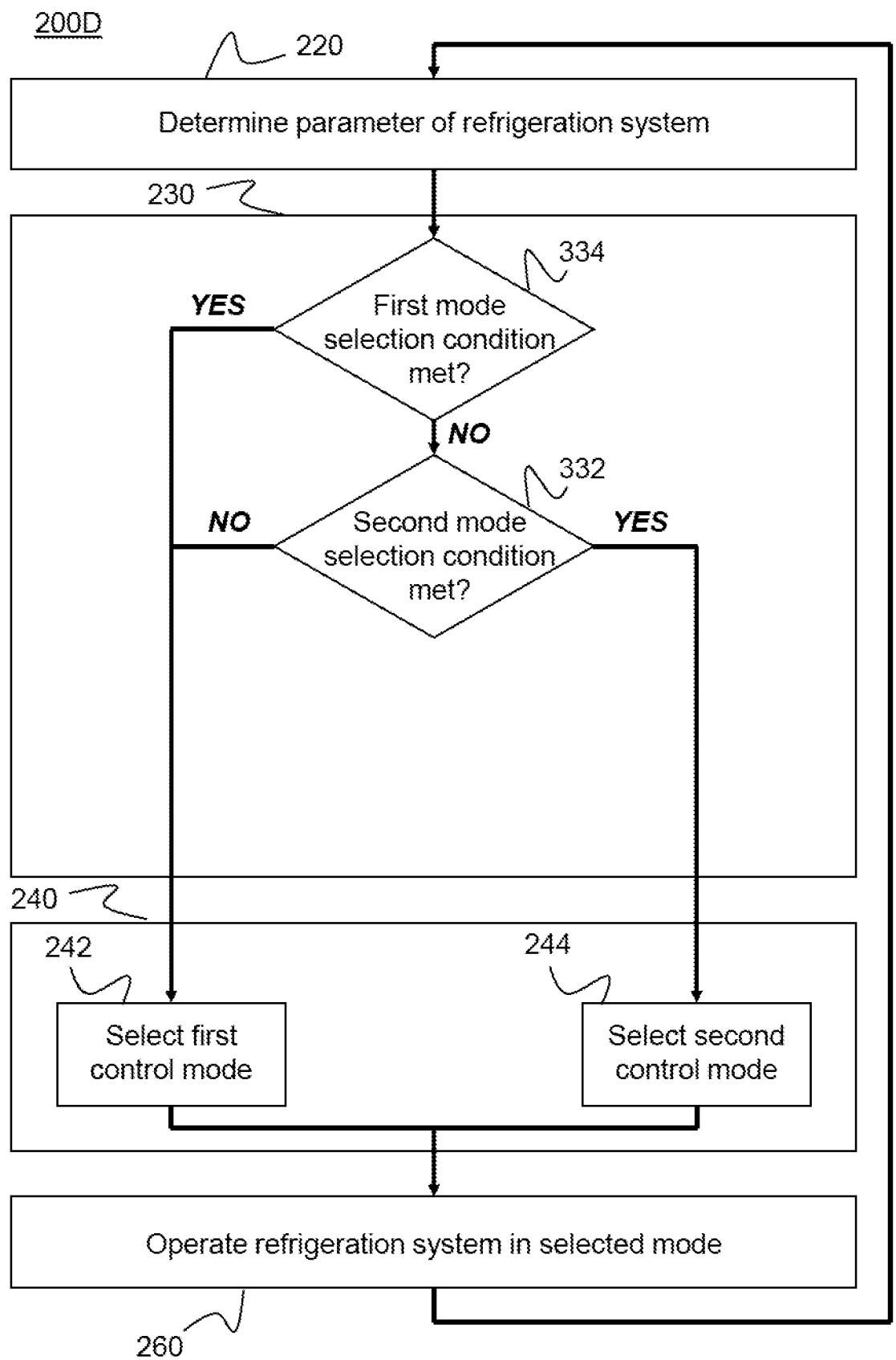
FIG. 6 is a flowchart of a fourth example implementation of the method of operating the refrigeration system.

FIG. 6 shows a flowchart of a fourth example implementation 200D of the method 200. The fourth example implementation 200D of the method 200 generally corresponds to the third example implementation 200C of the method 200 described above, with like reference numerals indicating common or similar features. However, in the fourth example implementation 200D of the method 200, if neither the second mode selection nor the first mode selection condition have been met, the refrigeration system 100 is operated in the first control mode. In particular, in the fourth example implementation of the method 200D, step 334 precedes step 332. If it is determined in step 334 that the first mode condition has been met, the method 200D proceeds to step 242 where the first control mode is selected. Step 332 occurs if it is determined in step 334 that the first mode selection condition is not met. Step 332 comprises determining whether a second mode selection condition is met. If it is determined in step 332 that the second mode selection condition has been met, the method 200D proceeds to step 244 where the second mode is selected. If it is determined in step 332 that the second mode selection condition has not been met (i.e. that neither the first mode selection condition nor the second mode selection condition have been met), the method 200D proceeds to step 242 where the first control mode is selected.

Again, it will be appreciated that any combination of the first and second mode selection conditions discussed above can be used in the fourth example implementation 200D.

FIG. 7 schematically shows an alternative refrigeration system 500. The alternative refrigeration system 500 generally corresponds to the refrigeration system 100, with like reference numerals indicating common or similar features. However, the alternative refrigeration system 500 differs from the refrigeration system 100 firstly in that it additionally comprises an additional downstream suction line pressure sensor 197 and an additional downstream suction line temperature sensor 201, and secondly in that the downstream suction line pressure and temperature sensors 195, 196 are positioned in a different location along the suction line 18 than in the refrigeration system 100.

Regarding the first difference mentioned above, the additional downstream suction line pressure and temperature sensors 197, 201 are disposed along a portion of the suction line 18 between the liquid-suction heat exchanger 110 and the accumulator tank 120. That is, the additional downstream suction line pressure and temperature sensors 197, 201 are positioned in the same location in the alternative refrigeration system 500 as where the downstream suction line pressure and temperature sensors 195, 196 are disposed in the refrigeration system 100. The additional downstream suction line pressure and temperature sensors 197, 201 may be disposed immediately downstream of the liquid-suction heat exchanger 110.

Regarding the second difference mentioned above, in the alternative refrigeration system 500, the downstream suction line pressure and temperature sensors 195, 196 are disposed along a portion of the suction line 18 downstream of the accumulator tank 120, and are therefore configured to sense the temperature and pressure of refrigerant within the suction line 18, respectively, at a position that is downstream of the accumulator tank 120. The additional downstream suction line pressure and temperature sensors 197, 201 are configured to sense an additional pressure and temperature of the refrigerant in the suction line 18 upstream of the downstream suction line pressure and temperature sensors 195, 196.

The superheat of the refrigerant in the suction line 18 at the position where the downstream suction line pressure and temperature sensors 195, 196 are disposed is determined by converting the pressure sensed by the downstream suction line pressure sensor 195 into a temperature using a pressure/temperature comparator and then subtracting this temperature from the temperature sensed by the downstream suction line temperature sensor 196. Alternative methods for determining the superheat may be used that will be apparent to those skilled in the art.

The superheat of the refrigerant in the suction line 18 at the position where the additional downstream suction line pressure and temperature sensors 197, 201 are disposed is determined by converting the additional pressure sensed by the additional downstream suction line pressure sensor 197 into a temperature using a pressure/temperature comparator and then subtracting this temperature from the additional temperature sensed by the additional downstream suction line temperature sensor 201. Alternative methods for determining the superheat may be used that will be apparent to those skilled in the art.

The superheat of the refrigerant in the suction line 18 at a position where the upstream suction line temperature and pressure sensors 194, 193 are disposed is determined by converting the pressure sensed by the upstream suction line pressure sensor 193 into a temperature using a pressure/temperature comparator and then subtracting this temperature from the temperature sensed by the upstream suction line temperature sensor 194. Alternative methods for determining the superheat may be used that will be apparent to those skilled in the art.

FIG. 8 shows a flowchart of a fifth example implementation 200E of the method 200 that can be used with the alternative refrigeration system 500. The fifth example implementation 200E of the method 200 generally corresponds to the third example implementation 200C of the method 200 described above, with like reference numerals indicating common or similar features. However, in the fifth example implementation 200E of the method 200, step 240 additionally comprises a third step 246. In addition, if neither the second mode selection nor the first mode selection condition have been met, the method 200 proceeds to step 246 where a third mode is selected.

The controller 190 is configured to operate the refrigeration system 100 in either a first mode, a second mode or a third mode.

In the fifth example implementation 200E of the method 200, in the first mode, the expansion valve 106 is controlled based on the superheat of refrigerant in the suction line 18 upstream of the liquid-suction heat exchanger 110 as determined using the upstream suction line pressure and temperature sensors 193, 194. This corresponds to the superheat at the outlet of the evaporator 108 and may be referred to as the evaporator outlet superheat (abbreviated as EVOSH). Operation of the refrigeration system 100 in the first mode may involve controlling the expansion valve 106 to bring the superheat of the refrigerant upstream of the liquid-suction heat exchanger 110 towards a target superheat value or towards or within a range of target superheat values.

In the fifth example implementation 200E of the method 200, in the second mode, the expansion valve 106 is controlled based on the superheat of refrigerant in the suction line 18 downstream of the additional downstream suction line pressure and temperature sensors 197, 201 as determined using the downstream suction line pressure and temperature sensors 195, 196. This corresponds to the superheat at the inlet 102 of the compressor 102 and may be referred to as the compressor vapour inlet superheat (abbreviated as PVISH). Operation of the refrigeration system 100 in the second mode may involve controlling the expansion valve 106 to bring the superheat of the refrigerant downstream of the additional downstream suction line pressure and temperature sensors 197, 201 (i.e. where the downstream suction line pressure and temperature sensors 195, 196 are located) towards a target superheat value or towards or within a range of target superheat values in the manner described above with reference to the first mode.

In the fifth example implementation 200E of the method 200, in the third mode, the expansion valve 106 is controlled based on the superheat of refrigerant in the suction line 18 upstream of the downstream suction line pressure and temperature sensors 195, 196 as determined using the additional downstream suction line pressure and temperature sensors 197, 201. This corresponds to the superheat at the outlet of the liquid-suction heat exchanger 110 and may be referred to as the heat exchanger vapour outlet superheat (abbreviated as HVOSH). Operation of the refrigeration system 100 in the third mode may involve controlling the expansion valve 106 to bring the superheat of the refrigerant downstream of the liquid-suction heat exchanger 110 and upstream of the downstream suction line pressure and temperature sensors 195, 196 (i.e. where the additional downstream suction line pressure and temperature sensors 197, 201 are located) towards a target superheat value or towards or within a range of target superheat values in the manner described above with reference to the first and second modes.

The target superheat value or target range of superheat values may be the same in the third mode as they are in the first and second modes. It may be that refrigerant within the suction line 18 is subject to temperature and/or pressure changes between the liquid-suction heat exchanger 110 and the inlet port 102A of the compressor 102. Controlling the expansion valve 106 based on the superheat of refrigerant at a location which is closer to the compressor 102 (as may be done in the second mode) allows precise and accurate control of the refrigeration system 100. To maximise this benefit, the downstream suction line pressure and temperature sensors 195, 196 may therefore be disposed immediately upstream of the compressor 102. However, controlling the expansion valve 106 based on the superheat of refrigerant at a location which is closer to the liquid-suction heat exchanger 110 (as is done in the third mode) maintains the overall capacity of the refrigeration system 100 at a higher level. In general terms, operation of the refrigeration system 100 in the second mode ensures that the superheat (and therefore the temperature) of refrigerant provided to the compressor 102 is lower than if the refrigeration system 100 were operated in the third mode under comparable operating conditions.

Although it has been described that step 332 in each of the example implementations of the method 200 comprises determining whether a second mode selection condition has been met, it may alternatively comprise an alternative step 332' of determining whether a first mode selection condition has been met.

In such an alternative first example implementation 200A' shown in FIG. 9, if it is determined in alternative step 332' that the first mode selection condition has been met, the method 200A proceeds to step 242 where the first mode is selected. If it is determined in alternative step 332' that the second mode selection condition has not been met, the method proceeds to step 244 where the second mode is selected.

In an alternative second example implementation 200B' shown in FIG. 10, if it is determined in alternative step 332' that the first mode selection condition has been met, the method 200A proceeds to step 242 where the first mode is selected. If it is determined in alternative step 332' that the first mode selection condition has not been met, the method 200B proceeds to an alternative step 334' comprising determining whether the second mode selection condition is met. If it is determined in alternative step 334' that the second mode selection condition has been met, the method 200B proceeds to step 244 where the second mode is selected. If it is determined in alternative step 334' that the second mode selection condition has not been met, the method 200B proceeds to step 333 which corresponds to step 333 of the second example implementation described with reference to FIG. 4.

In an alternative fifth example implementation 200E' shown in FIG. 11, if it is determined in alternative step 332' that the first mode selection condition has been met, the method proceeds to step 242 where the first mode is selected. If it is determined in alternative step 332' that the first mode selection condition has not been met, the method proceeds to alternative step 334' comprising determining whether the second mode selection condition is met. If it is determined in alternative step 334' that the second mode selection condition has been met, the method proceeds to step 244 where the second mode is selected. If it is determined in alternative step 334' that the second mode selection condition has not been met, the method proceeds to step 246 where the third mode is selected.

In any of the example implementations recited above that include step 333, step 333 can be replaced by an alternative step that comprises determining whether the refrigeration system 100 is currently operating in the first mode. If it is determined in such an alternative step that the refrigeration system 100 is currently operating in the first mode, the method 200B proceeds to step 242 where the first mode is selected. If it is determined in such an alternative step that the refrigeration system 100 is not currently operating in the first mode, the method 200B proceeds to step 244 where the second mode is selected.

In the abovementioned examples, the methods may initiate at any step. It should be generally understood that the flowcharts presented in the drawings are merely exemplary and the method 200 could be implemented in alternative ways falling within the scope of the claims.

Although it has been described that the refrigeration system comprises a process medium temperature sensor 198, external medium temperature sensor 199, discharge line pressure sensor 191 and discharge line temperature sensor 192, these may be omitted in arrangements in which the data from these sensors is not utilised.

Although it has been described that the sensors used to determine the superheat of the refrigerant in the suction line 18 downstream of the liquid-suction heat exchanger 110 in the second mode of the refrigeration system 100 are positioned upstream of the accumulator tank 120, they may alternatively be located downstream of the accumulator tank 120.

Although it has been described that the one or more parameters of the refrigeration system 100 may be a temperature of the refrigerant within the discharge line 12 (e.g. a sensed temperature of the refrigerant within the discharge line 12, a calculated temperature of the refrigerant within the discharge line 12 and/or an estimated temperature of the refrigerant within the discharge line 12), a pressure ratio of the compressor 102, a temperature of a process medium 103 and/or a temperature of an external medium 101, the one or more parameters of the refrigeration system 100 may be any suitable parameter of the refrigeration system.

Although it has been described that the controller is a single unit, it may alternatively be a collection of separate components (i.e. controllers) within the system. The controller(s) described herein may comprise a processor. The controller and/or the processor may comprise any suitable circuitry to cause performance of the methods described herein and as illustrated in the drawings. The controller or the processor may comprise or be in communication with one or more memories that store that data described herein, and/or that store machine readable instructions (e.g. software) for performing the processes and functions described herein (e.g. determinations of parameters and execution of control routines). The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware or be a combination of software and firmware.

Although the terms less than and greater than have been used throughout the description, it will be appreciated that these may be replaced by the terms less than or equal to and greater than or equal to, as appropriate.

The invention claimed is:

1. A refrigeration system, the refrigeration system comprising:
   a compressor;
   a condenser;
   an expansion valve;
   an evaporator;
   a liquid-suction heat exchanger;
   a suction line configured to convey a refrigerant from the evaporator to the compressor via the liquid-suction heat exchanger;
   a discharge line configured to convey the refrigerant from the compressor to the condenser;
   an upstream suction line temperature sensor configured to sense a temperature of the refrigerant in the suction line upstream of the liquid-suction heat exchanger;
   an upstream suction line pressure sensor configured to sense a pressure of the refrigerant in the suction line upstream of the liquid-suction heat exchanger;
   a downstream suction line temperature sensor configured to sense a temperature of the refrigerant in the suction line downstream of the liquid-suction heat exchanger;
   a downstream suction line pressure sensor configured to sense a pressure of the refrigerant in the suction line downstream of the liquid-suction heat exchanger; and
   a controller,
   wherein the controller is configured to:
      determine one or more parameters of the refrigeration system;
      determine whether a first mode selection condition has been met and/or whether a second mode selection condition has been met based on the determined one or more parameters;
      select a first mode upon the first mode selection condition having been determined to have been met and/or upon the second mode selection condition having been determined to have not been met;
      select a second mode upon the second mode selection condition having been determined to have been met and/or upon the first mode selection condition having been determined to have not been met; and operate the refrigeration system in the selected mode, wherein operating the refrigeration system in the first mode comprises controlling the expansion valve to bring a superheat of the refrigerant in the suction line upstream of the liquid-suction heat exchanger towards a first target superheat value or towards or within a first target range of superheat values, wherein the superheat of the refrigerant in the suction line upstream of the liquid-suction heat exchanger is determined based on the sensed temperature and pressure of the refrigerant in the suction line upstream of the liquid-suction heat exchanger, and wherein operating the refrigeration system in the second mode comprises controlling the expansion valve to bring a superheat of the refrigerant in the suction line downstream of the liquid-suction heat exchanger towards a second target superheat value or towards or within a second target range of superheat values, wherein the superheat of the refrigerant in the suction line downstream of the liquid-suction heat exchanger is determined based on the sensed temperature and pressure of the refrigerant in the suction line downstream of the liquid-suction heat exchanger.

2. The refrigeration system of claim 1, wherein the controller is configured to:
select the first mode upon the first mode selection condition having been determined to have been met or upon the second mode selection condition having been determined to have not been met; and
select the second mode upon the second mode selection condition having been determined to have been met or upon the first mode selection condition having been determined to have not been met.

3. The refrigeration system of claim 1, wherein the controller is configured to:
determine whether the first mode selection condition has been met and whether the second mode selection condition has been met;
select the first mode upon the first mode selection condition having been determined to have been met;
select the second mode upon the second mode selection condition having been determined to have been met; and
upon determining that neither the first mode selection condition nor the second mode selection condition have been met, select the first mode if the refrigeration system is currently operating in the first mode and select the second mode if the refrigeration system is currently operating in the second mode.

4. The refrigeration system of claim 1, wherein the controller is configured to:
determine whether the first mode selection condition has been met and whether the second mode selection condition has been met;
select the first mode upon the first mode selection condition having been determined to have been met;
select the second mode upon the second mode selection condition having been determined to have been met; and
upon determining that neither the first mode selection condition nor the second mode selection condition have been met, select the second mode.

5. The refrigeration system of claim 1, wherein the controller is configured to:
determine whether the first mode selection condition has been met and whether a second mode selection condition has been met;
select the first mode upon the first mode selection condition having been determined to have been met;
select the second mode upon the second mode selection condition having been determined to have been met; and
upon determining that neither the first mode selection condition nor the second mode selection condition have been met, select the first mode.

6. The refrigeration system of claim 1, further comprising an accumulator tank configured to remove liquid droplets from the refrigerant within the suction line, wherein the accumulator tank is disposed along the suction line downstream of the downstream suction line pressure and temperature sensors.

7. The refrigeration system of claim 1, further comprising:
an additional downstream suction line temperature sensor configured to sense an additional temperature of the refrigerant in the suction line upstream of the downstream suction line pressure and temperature sensors; and
an additional downstream suction line pressure sensor configured to sense an additional pressure of the refrigerant in the suction line upstream of the downstream suction line pressure and temperature sensors,
wherein the controller is configured to:
determine whether the first mode selection condition has been met and whether the second mode selection condition has been met;
select the first mode upon the first mode selection condition having been determined to have been met;
select the second mode upon the second mode selection condition having been determined to have been met;
upon determining that neither the first mode selection condition nor the second mode selection condition have been met, select a third mode; and
operate the refrigeration system in the selected mode, wherein operating the refrigeration system in the third mode comprises controlling the expansion valve to bring a superheat of the refrigerant in the suction line upstream of the downstream suction line pressure and temperature sensors towards a third target superheat value or towards or within a third target range of superheat values, wherein the superheat of the refrigerant in the suction line upstream of the downstream suction line pressure and temperature sensors is determined based on the sensed additional temperature and additional pressure of the refrigerant in the suction line upstream of the downstream suction line pressure and temperature sensors.

8. The refrigeration system of claim 7, further comprising an accumulator tank configured to remove liquid droplets from the refrigerant within the suction line, wherein the accumulator tank is disposed along the suction line upstream of the downstream suction line pressure and temperature sensors and downstream of the additional downstream suction line pressure and temperature sensors.

9. The refrigeration system of claim 1, wherein the parameter of the refrigeration system is a temperature of the refrigerant within the discharge line,
wherein the first mode selection condition is determined to have been met when the temperature of the refrigerant within the discharge line is less than a first threshold temperature value, and/or wherein the second mode selection condition is determined to have been met when the temperature of the refrigerant within the discharge line is greater than a second threshold temperature value.

10. The refrigeration system of claim 9, wherein the parameter of the refrigeration system is a sensed temperature of the refrigerant within the discharge line, wherein the refrigeration system comprises a discharge line sensor disposed along the discharge line and configured to sense the sensed temperature of the refrigerant within the discharge line, wherein the first mode selection condition is determined to have been met when the sensed temperature of the refrigerant within the discharge line is less than the first threshold temperature value, and/or wherein the second mode selection condition is determined to have been met when the sensed temperature of the refrigerant within the discharge line is greater than the second threshold temperature value.

11. The refrigeration system of claim 9, wherein the parameter of the refrigeration system is a calculated temperature of the refrigerant within the discharge line, wherein the controller is configured to calculate the calculated temperature of the refrigerant within the discharge line, wherein the first mode selection condition is determined to have been met when the calculated temperature of the refrigerant within the discharge line is less than the first threshold temperature value, and/or wherein the second mode selection condition is determined to have been met when the calculated temperature of the refrigerant within the discharge line is greater than the second threshold temperature value.

12. The refrigeration system of claim 9, wherein the parameter of the refrigeration system is an estimated temperature of the refrigerant within the discharge line, wherein the controller is configured to estimate the estimated temperature of the refrigerant within the discharge line using a predetermined model, the predetermined model having the estimated temperature of the refrigerant within the discharge line as an output, and wherein the first mode selection condition is determined to have been met when the estimated temperature of the refrigerant within the discharge line is less than the first threshold temperature value, and/or wherein the second mode selection condition is determined to have been met when the estimated temperature of the refrigerant within the discharge line is greater than the second threshold temperature value.

13. The refrigeration system of claim 1, wherein the parameter of the refrigeration system is a pressure ratio of the compressor, wherein the controller is configured to determine the pressure ratio of the compressor, the pressure ratio of the compressor being the ratio of the pressure of the refrigerant provided to the compressor to the pressure of the refrigerant discharged from the compressor, wherein the first mode selection condition is determined to have been met when the pressure ratio of the compressor is less than a first threshold pressure ratio value, and/or wherein the second mode selection condition is determined to have been met when the pressure ratio of the compressor is greater than a second threshold pressure ratio value.

14. The refrigeration system of claim 1, wherein:
the first and second target superheat values are the same; or
the first and second target range of superheat values are the same; or
the first, second and third target superheat values are the same; or
the first, second and third target range of superheat values are the same.

15. A method of operating a refrigeration system that includes: a compressor; a condenser; an expansion valve; an evaporator; a liquid-suction heat exchanger; a suction line configured to convey a refrigerant from the evaporator to the compressor via the liquid-suction heat exchanger; a discharge line configured to convey the refrigerant from the compressor to the condenser; an upstream suction line temperature sensor configured to sense a temperature of the refrigerant in the suction line upstream of the liquid-suction heat exchanger; an upstream suction line pressure sensor configured to sense a pressure of the refrigerant in the suction line upstream of the liquid-suction heat exchanger; a downstream suction line temperature sensor configured to sense a temperature of the refrigerant in the suction line downstream of the liquid-suction heat exchanger; a downstream suction line pressure sensor configured to sense a pressure of the refrigerant in the suction line downstream of the liquid-suction heat exchanger; and a controller, the method comprising:

determining one or more parameters of the refrigeration system;

determining whether a first mode selection condition has been met and/or whether a second mode selection condition has been met based on the determined one or more parameters;

selecting a first mode upon the first mode selection condition having been determined to have been met and/or upon the second mode selection condition having been determined to have not been met;

selecting a second mode upon the second mode selection condition having been determined to have been met and/or upon the first mode selection condition having been determined to have not been met; and operating the refrigeration system in the selected mode, wherein operating the refrigeration system in the first mode comprises controlling the expansion valve to bring a superheat of the refrigerant in the suction line upstream of the liquid-suction heat exchanger towards a first target superheat value or towards or within a first target range of superheat values, wherein the superheat of the refrigerant in the suction line upstream of the liquid-suction heat exchanger is determined based on the sensed temperature and pressure of the refrigerant in the suction line upstream of the liquid-suction heat exchanger; and wherein operating the refrigeration system in the second mode comprises controlling the expansion valve to bring a superheat of the refrigerant in the suction line downstream of the liquid-suction heat exchanger towards a second target superheat value or towards or within a second target range of superheat values, wherein the superheat of the refrigerant in the suction line downstream of the liquid-suction heat exchanger is determined based on the sensed temperature and pressure of the refrigerant in the suction line downstream of the liquid-suction heat exchanger.

* * * * *